(12) United States Patent
Woodrough, Jr. et al.

(10) Patent No.: US 12,157,641 B2
(45) Date of Patent: Dec. 3, 2024

(54) SHIFTING, RE-ORIENTING, ORGANIZING, AND/OR ROUTING OBJECTS INCLUDING PARCELS AND PACKAGES

(71) Applicant: United Parcel Service of America, Inc., Atlanta, GA (US)

(72) Inventors: Stephens B. Woodrough, Jr., Peachtree Corners, GA (US); Joshua D. Brown, Carmel, IN (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 17/960,631

(22) Filed: Oct. 5, 2022

(65) Prior Publication Data
US 2024/0116717 A1    Apr. 11, 2024

(51) Int. Cl.
*B65G 47/24*    (2006.01)
*B65G 47/244*   (2006.01)
*B65G 47/38*    (2006.01)

(52) U.S. Cl.
CPC .......... *B65G 47/24* (2013.01); *B65G 47/38* (2013.01); *B65G 47/244* (2013.01)

(58) Field of Classification Search
CPC ...... B65G 47/244; B65G 47/24; B65G 47/38; B65G 47/252
USPC ............ 198/402, 403, 406, 413, 704, 550.2
See application file for complete search history.

(56) References Cited

U.S. PATENT DOCUMENTS

| 2,595,689 | A | * | 5/1952 | Mitchell | B65G 17/48 |
| | | | | | 414/378 |
| 4,171,739 | A | * | 10/1979 | Yamato | B65G 17/48 |
| | | | | | 198/792 |
| 4,892,185 | A | * | 1/1990 | Guardiola | G01G 19/393 |
| | | | | | 198/483.1 |

(Continued)

FOREIGN PATENT DOCUMENTS

| DE | 1121866 B | 1/1962 |
| DE | 102004001794 B4 | * 9/2007 | ............... B07C 5/36 |

(Continued)

OTHER PUBLICATIONS

European search report received for European Application No. 23200078.6, mailed on Apr. 11, 2024, 10 pages.

*Primary Examiner* — James R Bidwell
(74) *Attorney, Agent, or Firm* — Shook, Hardy & Bacon L.L.P.

(57) ABSTRACT

Systems, methods, and apparatuses for shifting, orienting, organizing, and/or routing objects including parcels and packages. In different aspects, the systems can shift objects, re-orient the objects, e.g., based on dimensions and/or geometries, and then can deposit the objects into transport receptacles used for additional shifting, organizing, and/or routing. In one aspect, an object-orienting mechanism includes a pivot-assembly having a plurality of pivoting-extensions, e.g., that can be independently rotated into different positions, e.g., to manipulate a package. In another aspect, a bin for holding objects includes a base, a plurality of sidewalls extending from the base, and a releasing mechanism that is adjustable into different configurations. In another aspect, a method of re-orienting objects onto a side of smallest dimension or cross-section is provided. This can be used to increase the efficiency of processing objects, e.g., in a logistics network operation.

20 Claims, 23 Drawing Sheets

(56) References Cited

U.S. PATENT DOCUMENTS

| | | | |
|---|---|---|---|
| 5,025,911 A | | 6/1991 | Raasch et al. |
| 5,346,052 A | * | 9/1994 | Fox ........................ B65G 47/38 |
| | | | 198/712 |
| 5,535,874 A | * | 7/1996 | Ross .................... B65G 17/123 |
| | | | 198/704 |
| 5,842,556 A | * | 12/1998 | van Hattum ........... B65G 47/38 |
| | | | 198/370.05 |
| 6,126,017 A | * | 10/2000 | Hours ....................... B07C 3/06 |
| | | | 198/704 |
| 10,301,121 B1 | * | 5/2019 | Hoffman ................ B65G 15/00 |
| 2005/0006206 A1 | | 1/2005 | Balk et al. |
| 2016/0052725 A1 | | 2/2016 | Mao |
| 2021/0094074 A1 | | 4/2021 | Rieu et al. |

FOREIGN PATENT DOCUMENTS

| | | |
|---|---|---|
| EP | 3797881 A1 | 3/2021 |
| GB | 0607707 A | 9/1948 |
| JP | 58-144018 A | 8/1983 |
| JP | 61-114913 A | 6/1986 |
| JP | 2009-084057 A | 4/2009 |

\* cited by examiner

SHIFTING, RE-ORIENTING, ORGANIZING, AND/OR ROUTING OBJECTS INCLUDING PARCELS AND PACKAGES

TECHNICAL FIELD

The field relates to automated handling of objects.

BACKGROUND

The shifting of objects, e.g., parcels and packages, presents unique challenges. For example, objects of different sizes and shapes often require different handling processes or different handling equipment, and in addition, processing a large number of objects can require significant space. In addition, shifting a large number of objects can sometimes require a significant amount of manual handling. This can increase the cost, space, and/or time required to process the objects, among other challenges.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, systems, methods, apparatuses, and technologies for shifting, orienting, organizing, and/or routing objects including parcels and packages, among other things. These embodiments may be implemented in a logistics network operation, among other instances. In one aspect, a system is provided that can shift and/or re-orient objects, e.g., based on their shape and/or dimensions, and then release the objects into transport receptacles for further shifting, organizing, and/or routing. In another aspect, an object-orienting mechanism is provided. The object-orienting mechanism can include a pivot-assembly, a plurality of pivoting-extensions, e.g., that can be independently rotated into different positions, and a plurality of actuators, e.g., that can shift the pivoting-extensions, e.g., at the direction of a control system. In another aspect, a bin for transporting objects is provided. The bin can include a base, at least one sidewall extending to an opening, and a releasing mechanism that is operable to support or release objects deposited into the bin. In another aspect, a container that can support objects is provided, and a container-flipping mechanism that can be used to displace objects from the container is provided. In another aspect, a process of re-orienting, re-positioning, and/or depositing objects is provided. In one instance, objects can be re-oriented onto a side of shortest and/or smallest dimension, e.g., to allow for processing using a smallest available footprint, among other benefits. In summary, the embodiments described herein can support faster, more effective, and more space-efficient shifting and processing of objects, e.g., in a logistics network operation, among other benefits.

BRIEF DESCRIPTION OF THE DRAWINGS

The embodiments described herein that can be used for shifting, orienting, organizing, and/or routing objects including parcels and packages are described in detail in connection with the attached drawing figures, which are intended to illustrate non-limiting examples of the disclosed subject matter, wherein.

DETAILED DESCRIPTION

Figure 1:
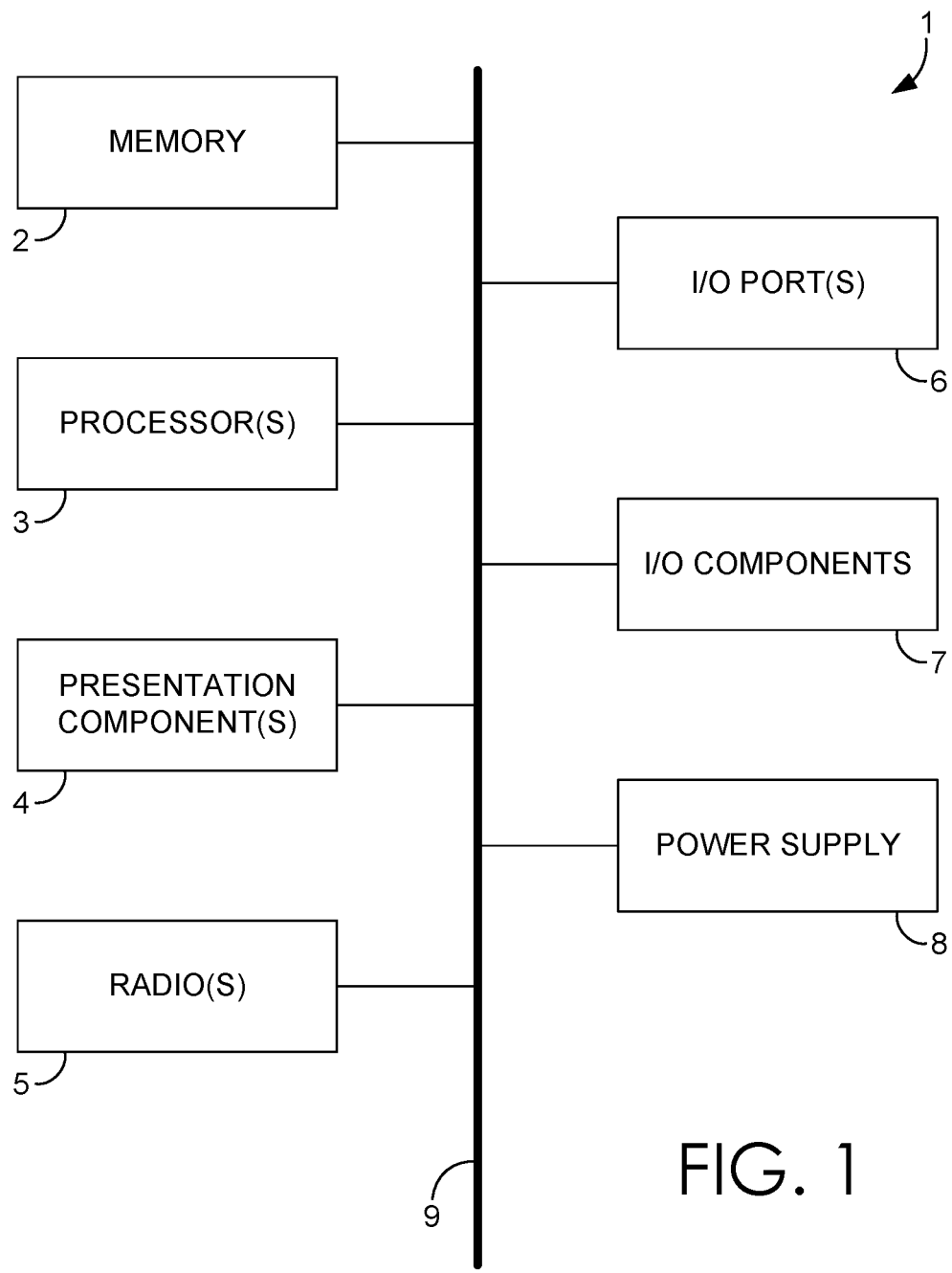
FIG. 1 depicts a block diagram of a computer system suitable for supporting and performing different functions described herein.

This detailed description is provided in order to meet statutory requirements. However, this description is not intended to limit the scope of the invention. Rather, the claimed subject matter may be embodied in other ways, to include different steps, different combinations of steps, different features, and/or different combinations of features, similar to those described in this disclosure, and in conjunction with other present or future technologies or techniques. In addition, while the terms "step" or "block" may be used herein to identify different elements of methods employed, the terms should not be interpreted as implying any particular order among or between the described elements except when the order is explicitly stated.

In general, and at a high level, this disclosure describes, among other things, embodiments that support and enable the shifting, re-orienting, organizing, and/or routing of objects, e.g., parcels and packages, e.g., in a logistics network operation, among other things. In some aspects described herein, objects can be handled, processed, and/or transferred more efficiently through re-orienting the objects onto a side of shortest or smallest dimension. This can be used to reduce or limit the footprint of the objects, e.g., during storage and transfer, which can allow a greater number of objects to be processed and/or allow objects to be processed with greater efficiency. Different embodiments that support such efficient processing, including object-orienting mechanisms, object-shifting mechanisms, storage bins, containers, and the like, are described in detail below in connection with accompanying FIGS. 1-23.

The subject matter of this disclosure may be provided as, at least in part, a method, a system, and/or a computer program product, among other things. Accordingly, certain aspects described herein may be hardware, software, or may be a combination of software and hardware. A computer program that includes computer-useable instructions embodied on one or more computer-readable media may also be used. The subject matter herein may further be implemented as hard-coded into the mechanical design of computing components and/or may be built into a system or components thereof used for shifting, re-orienting, organizing, and/or routing objects such as parcels and packages, e.g., such as boxes, containers, bags, pouches, carriers, totes, and the like.

Computer-readable media may include volatile media, non-volatile media, removable media, and non-removable media, and may also include media readable by a database, a switch, and/or various other network devices. Network switches, routers, and related components are conventional in nature, as are methods of communicating with the same, and thus, further elaboration is not provided in this disclosure. By way of example, and not limitation, computer-readable media may include computer storage media and/or non-transitory communications media.

Computer storage media, or machine-readable media, may include media implemented in any method or technology for storing information. Examples of stored information include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently, and are not limited to the examples provided herein.

Referring now to FIG. 1, a block diagram of an example computing device 1 suitable for supporting and performing functions described herein is provided, in accordance with an embodiment of the present disclosure. It should be noted that although some components depicted in FIG. 1 are shown in the singular, they may be plural, and the components may be connected in a different, including distributed, configuration. For example, computing device 1 might include multiple processors and/or multiple radios. The computing device 1 shown in FIG. 1 includes a bus 9 that may directly or indirectly connect different components together, e.g., such as memory 2, processor(s) 3, presentation component(s) 4 (if applicable), radio(s) 5, input/output (I/O) port(s) 6, input/output (I/O) component(s) 7, and/or power supply 8.

Memory 2 may take the form of the memory components described herein. Thus, further elaboration will not be provided here, but memory 2 may include any type of tangible medium that is capable of storing information, such as a database. A database may include any collection of records, data, and/or other information. In one embodiment, memory 2 may include a set of computer-executable instructions that, when executed, facilitate various functions or steps associated with the subject matter described herein. These instructions will be referred to as "instructions" or an "application" for short. The processor 3 may actually be multiple processors that may receive instructions and process them accordingly. The presentation component 4 may include a display, a speaker, a screen, a portable digital device, and/or other components that can present information through visual, auditory, and/or other tactile cues (e.g., a display, a screen, a lamp, a light-emitting diode (LED), a graphical user interface (GUI), and/or a lighted keyboard).

The radio 5 may facilitate communication with a network, and may additionally or alternatively facilitate other types of wireless communications, such as Wi-Fi, WiMAX, LTE, Bluetooth, and/or VoIP communications, among other possible communication protocols. In various aspects, the radio 5 may be configured to support multiple technologies, and/or multiple radios may be configured and utilized to support multiple technologies in the embodiments contemplated herein.

The input/output (I/O) ports 6 may take a variety of forms. Example I/O ports may include a Universal Serial Bus ("USB") jack, a stereo jack, an infrared port, and/or other proprietary communications ports. The input/output (I/O) components 7 may include one or more keyboards, microphones, speakers, touchscreens, and/or any other item useable to directly or indirectly input data into the computing device 1. The power supply 8 may comprise batteries, generators, fuel cells, an electrical supply source and/or any other component that may act as a power source to supply power to computing device 1 and to any other components described herein.

Figure 2:
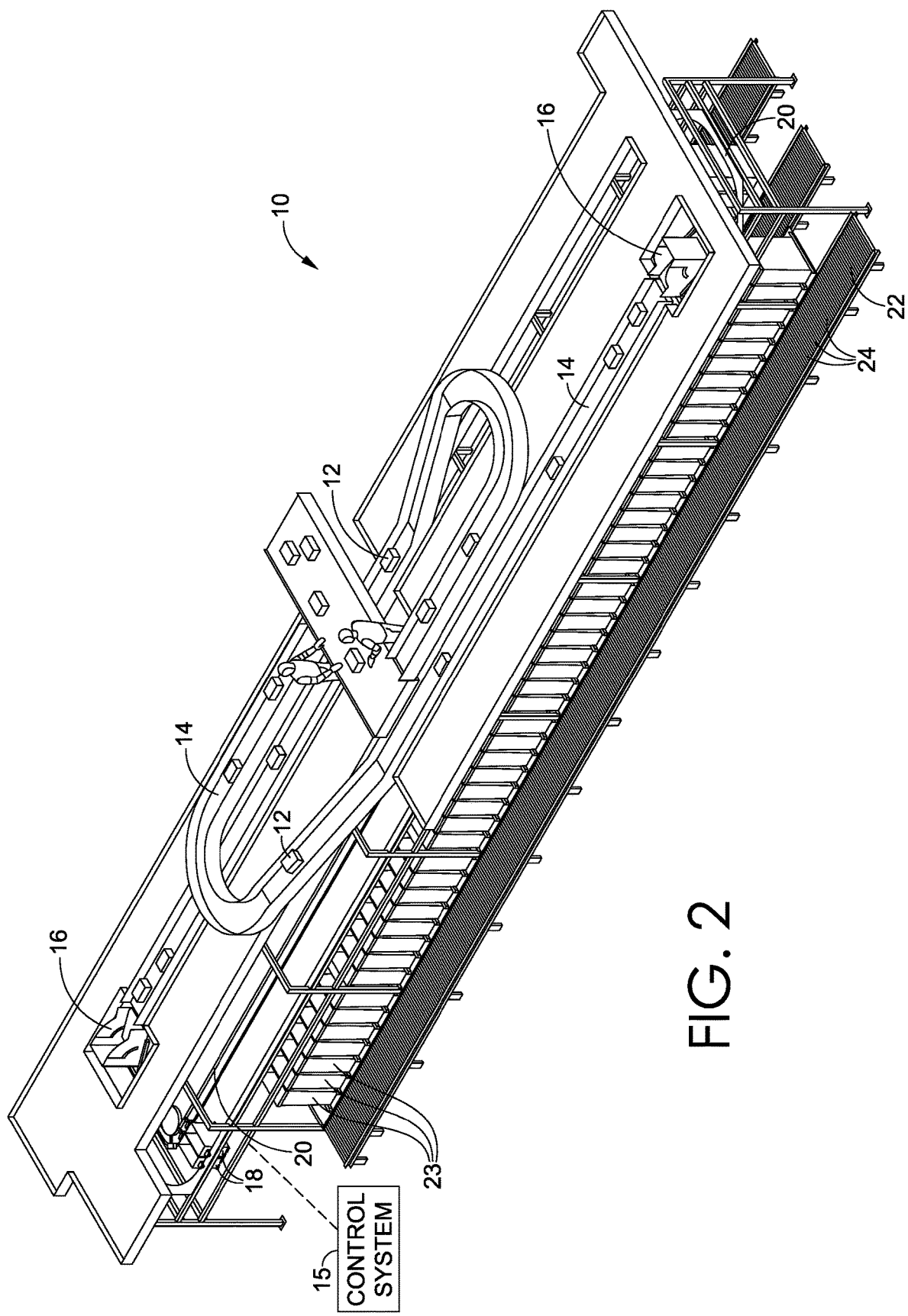
FIG. 2 depicts a system for shifting objects, in accordance with an embodiment of the present disclosure.

Looking now at FIG. 2, a system 10 for shifting objects, e.g., the objects 12, is shown, in accordance with an embodiment of the present disclosure. The system 10 is represented in FIG. 2 as a collection of structures, mechanisms, and technologies that operate in coordination to shift, re-orient, store, organize, and/or route the objects 12 to different locations. In different instances, the objects 12 can be boxes, containers, bags, pouches, carriers, totes, and the like. The system 10 can be used in a logistics network operation, among other possible uses.

The system 10 includes object-supply mechanisms 14. In one embodiment, each object-supply mechanism 14 is a conveyor, or a series of conveyors, e.g., those that include one or more belts, rollers, actuators, and/or other components. The object-supply mechanisms 14 can be used to initially transfer the objects 12 through the system 10, e.g., transiting them towards object-orienting mechanisms 16. The object-orienting mechanisms 16 can be used to re-orient the objects 12 (if needed), e.g., into a desired orientation for loading into storage bins 18. The selected orientation can be such that the object 12 is resting or supported on its shortest or smallest dimensional side, among other possible orientations. The objects 12 can then be deposited into the bins 18, and then transferred around the system 10 along track(s) 20.

Looking still at FIG. 2, the storage bins 18 are transferred through the system 10 along the track(s) 20 such that each storage bin 18 is eventually routed under at least one of the object-orienting mechanisms 16. This allows the objects 12 that are supplied by the object-supply mechanisms 14 to be engaged, re-oriented, and then released/deposited by the object-orienting mechanisms 16 into the storage bins 18 that are sequentially positioned under the object-orienting mechanisms 16. Next, the storage bin 18 with the object 12 can be shifted along the track(s) 20 until the storage bin 18 is in position over a particular container 23, e.g., one associated with a downstream location of the object 12, and/or one associated with an ultimate destination of the object 12. The containers 23 can be supported and transferred along a track 22, and subsequently manipulated by additional mechanisms, e.g., a container-flipping mechanism that can transfer the objects 12 in the containers 23 to other parts of the system 10. The displacement of the containers 23 can be facilitated using different mechanisms, e.g., linear actuators, pushers, and the like. In different embodiments, the track 22 can be a passive track (e.g., having a series of passive rollers), a powered track (e.g., having a series of powered rollers or conveyors), or a combination thereof. The track 22 shown in FIG. 2 includes a series of rollers 24. The operation of different components of the system 10, e.g., such as the object-supply mechanisms 14, the object-orienting mechanisms 16, the track(s) 20, the track(s) 22, and other associated components, mechanisms, actuators, and technologies, may be directed by a control system 15, e.g., one that includes one or more computing devices, communication components, and/or supporting software applications.

Figure 3:
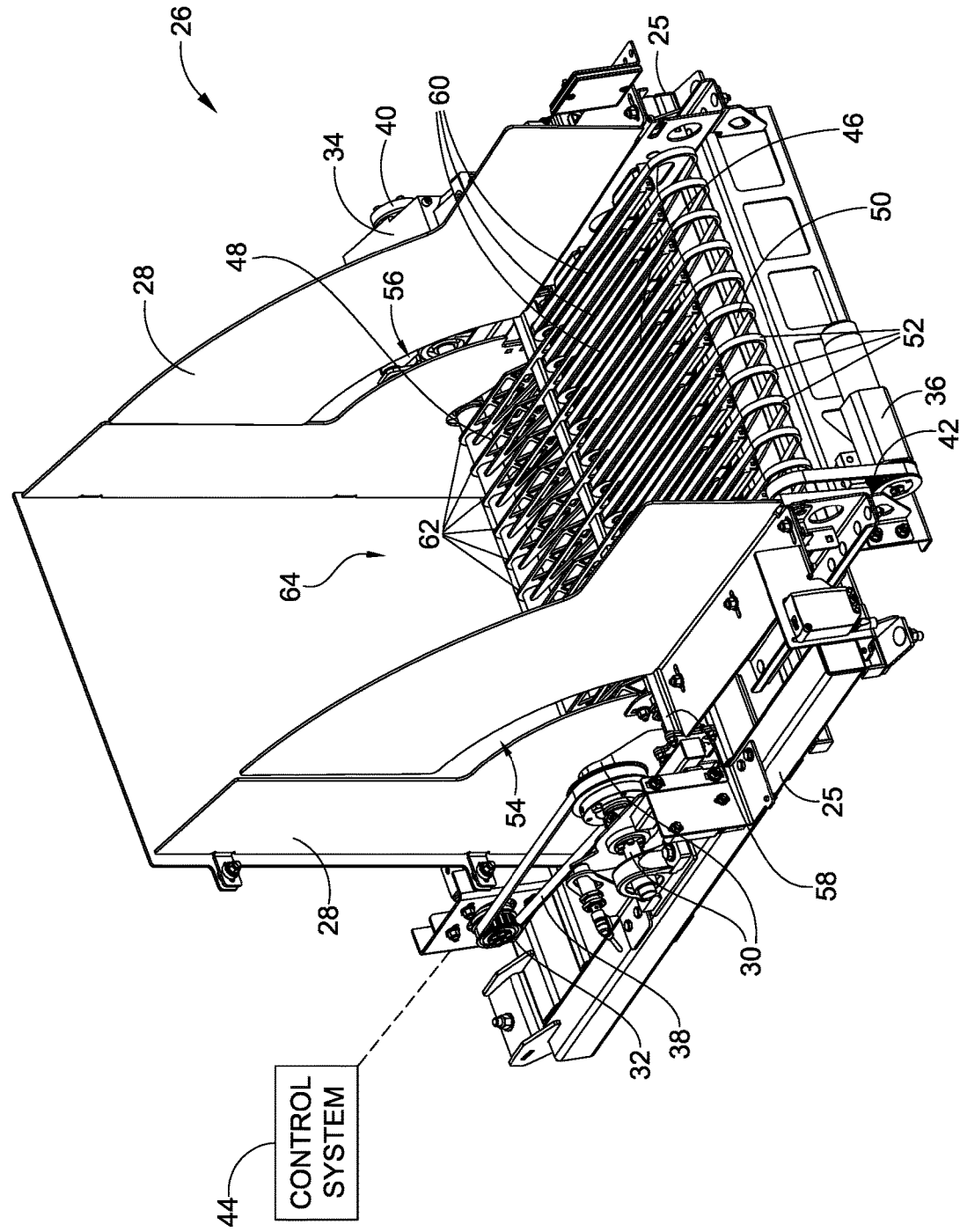
FIG. 3 depicts an object-orienting mechanism, in accordance with an embodiment of the present disclosure.
Figure 4A:
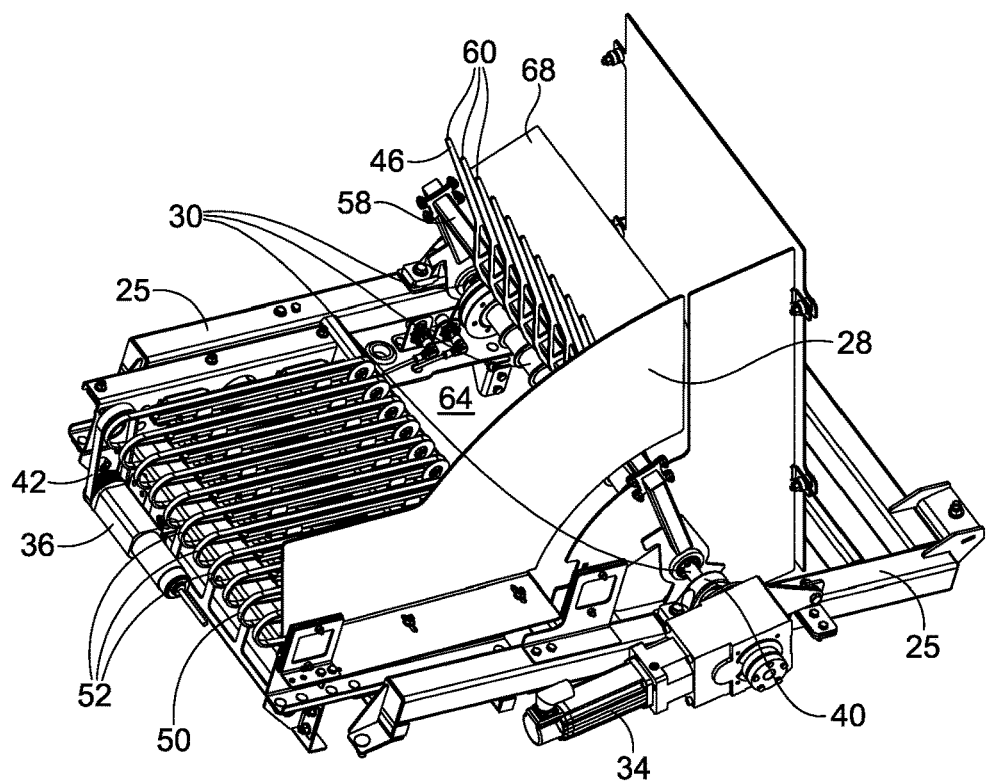
FIGS. 4A-4B depict the object-orienting mechanism of FIG. 3 from different perspectives, and with components omitted for clarity, in accordance with an embodiment of the present disclosure.
Figure 4B:
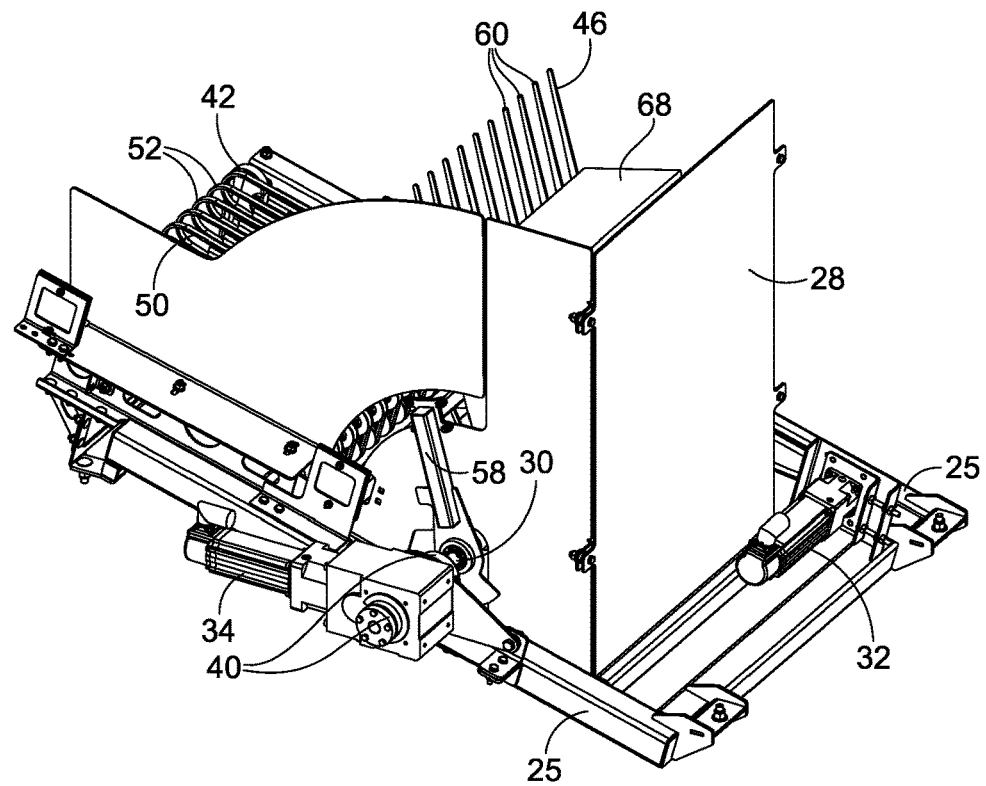

Looking now at FIG. 3, an object-orienting mechanism 26 is shown, in accordance with an embodiment of the present disclosure. The object-orienting mechanism 26 includes an assembly of components that operate in coordination to shift and re-orient an object, e.g., a parcel, package, or other receptacle, into a different orientation. This re-orienting of objects can be performed in furtherance of routing the objects, e.g., towards a downstream and/or final location. In addition to FIG. 3, FIGS. 4A and 4B show the object-orienting mechanism 26 with some components omitted for clarity, simplicity, and explanation.

The object-orienting mechanism 26 includes a housing 28 and a frame 25 that supports the housing 28. The object-orienting mechanism 26 also includes a pivot-assembly 30. The pivot-assembly 30 provides a common axis of rotation for multiple elements including pivoting-extensions 46 and 48, described below. The object-orienting mechanism 26 also includes a plurality of actuators 32, 34, 36 that are operable to rotate different components of the object-orienting mechanism 26. In the example embodiment of FIGS. 3-11, the actuators 32, 34, 36 are rotational actuators, e.g., that are electrically, pneumatically, and/or hydraulically powered, that during operation can impart rotation to other components. In one aspect, the actuators 32, 34, 36 can be electrically-powered motors. The actuators 32, 34, 36 are coupled to belt-driven assemblies 38, 40, 42. The belt-driven assemblies 38, 40, 42 each include a belt extended over multiple rollers/wheels. The belt-driven assemblies 38, 40, 42 allow rotational motion generated by the actuators 32, 34, 36 to be transferred to other components of the object-orienting mechanism 26, e.g., such as the pivoting-extensions 46, 48. The actuators 32, 34, 36 can be connected to a control system 44 that can direct operation of the actuators 32, 34, 36. The control system 44 is depicted generically in FIG. 3 for explanation purposes, but can include computing components, communication components, software applications, and/or other technologies that support its operation. The control system 44 can be configured to operate the actuators 32, 34, 36 independently, and/or in coordination, e.g., at least partially together.

The object-orienting mechanism 26 includes a pivoting-extension 46, a pivoting-extension 48, and a shifting mechanism 50. The pivoting-extension 46 is rotatably coupled to the pivot-assembly 30. The pivoting-extension 46 is also coupled to the actuator 32 through the belt-driven assembly 38. Thus, operation of the actuator 32 translates the corresponding belt-driven assembly 38 which rotates the pivoting-extension 46 to different positions on the pivot-assembly 30. The translation of the pivoting-extension 46 to different rotational positions is guided by a support element 58 that shifts generally within a pair of tracks 54, 56 located on opposite sides of the housing 28. The pivoting-extension 48 is also rotatably coupled to the pivot-assembly 30, and similarly is coupled to the actuator 34. Thus, operation of the actuator 34 translates the corresponding belt-driven assembly 40, which rotates the pivoting-extension 48 into different rotational positions on the pivot-assembly 30. In different embodiments, the rotational force from the actuator 34 may be imparted directly to the pivoting-extension 48, or may be imparted indirectly to the pivoting-extension 48, e.g., through use of the belt-driven assembly 40. The inclusion of the separate actuators 32, 34 allows the pivoting-extensions 46, 48 to be rotated independently, or in unison, e.g., dependent on the operation being performed. In addition, the different geometries of the pivoting-extensions 46, 48 can allow for different lengths of support to be provided using the pivot-assembly 30. For example, in one instance, the pivoting-extension 46 may be at least twice the length (measured outward from the pivot-assembly 30) of the pivoting-extension 48. This differential in length can be based on the dimensions of objects being handled by the object-orienting mechanism 26, and has been demonstrated to facilitate the orienting of objects, e.g., parcels and packages, onto their shortest and/or smallest dimensional side, among other benefits.

The pivoting-extension 46 includes a plurality of spaced-apart fingers 60 (only some of which are identified for clarity). The pivoting-extension 48 includes a plurality of spaced-apart fingers 62 (only some of which are identified for clarity). In addition, the pivoting-extensions 46, 48 are each able to rotate about the pivot-assembly 30, i.e., about a common axis of rotation, such that the fingers 60 can shift between the fingers 62, and vice-versa. In other words, the axial-spacing and positioning of the fingers 60 across the pivot-assembly 30 and the axial-spacing and positioning of the fingers 62 across the pivot-assembly 30 is such that the pivoting-extensions 46, 48 can rotate into planar alignment (e.g., as shown in FIG. 3) with the fingers 60, 62 forming an interposed, alternating sequence in the same plane. To state it differently, the fingers 60, 62 are offset axially along the pivot-assembly 30 so that rotation of the fingers 60, 62 into a common plane is possible without the fingers 60, 62 directly contacting, or blocking, each other. This facilitates rotation of the pivoting-extensions 46, 48 to form different geometries, e.g., suitable for holding, rotating, and/or releasing objects, as discussed further in connection with FIGS. 5-10.

Looking at FIGS. 3, 4A, and 4B, the shifting mechanism 50 is shown. The shifting mechanism 50 includes a plurality of spaced-apart transfer mechanisms 52 (only some of which are identified for clarity) that are arranged in spaced-apart relation and in a substantially parallel configuration. The transfer mechanisms 52 can be operated to shift objects towards the pivoting-extensions 46, 48, and onto the pivoting-extensions 46, 48 when the pivoting-extensions 46, 48 are in planar alignment with the transfer mechanisms 52 of the shifting mechanism 50, e.g., as shown in FIG. 3. The transfer mechanisms 52 each include a belt-driven assembly, e.g., one that includes a belt/cable and a plurality of rollers, which can be rotated by the actuator 36 to translate objects supported on the transfer mechanisms 52.

To shift objects onto the pivoting-extension 46, the fingers 60 of the pivoting-extension 46 can be rotated about the pivot-assembly 30 substantially into planar alignment with the transfer mechanisms 52, e.g., such that the fingers 60 are located generally between the transfer mechanisms 52, generally aligned along the same plane, e.g., as shown in FIG. 3. The actuator 36 associated with the shifting mechanism 52 can then be operated to shift an object supported on the transfer mechanisms 52 onto the fingers 60 of the pivoting-extension 46. Then, with the object supported on the pivoting-extension 46, the pivoting-extension 46 can be rotated so that the fingers 60 lift the object into another position/orientation, e.g., in conjunction with the pivoting-extension 48. This shifting process is further described in connection with FIGS. 5-11.

Figure 8:
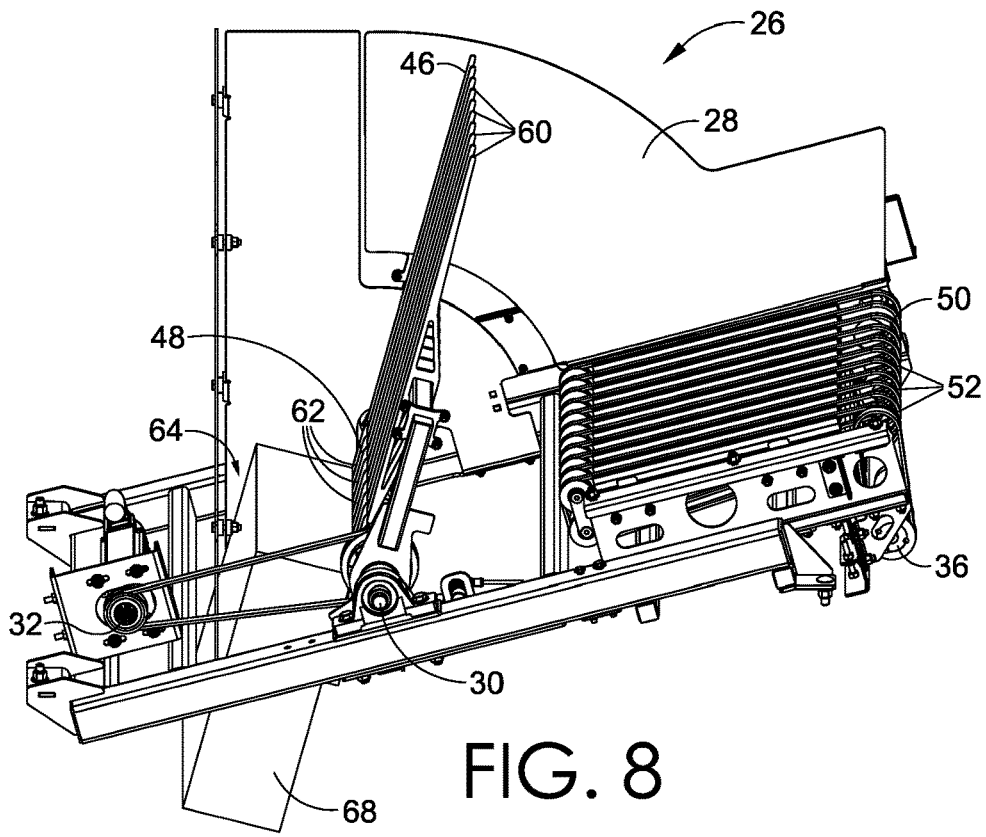

Looking at FIG. 3, it can be seen that the object-orienting mechanism 26 includes a chute 64. The chute 64 is defined at least partially by the housing 28, and is designed to align with an opening in a storage receptacle positioned below the object-orienting mechanism 26. To provide an example, a process of shifting and re-orienting an object 68 (shown in FIG. 4A) using the object-orienting mechanism 26 will be described. First, the object 68 is transferred along the shifting mechanism 50, onto the pivoting-extension 46, and then the object 68 is lifted by the pivoting-extensions 46, 48 and rotated into a different orientation (as shown in FIGS. 4A and 4B), e.g., one in which the object is supported on its shortest and/or smallest dimensional side. Then, the pivoting-extensions 46, 48 are adjusted so that the object 68 is released to gravity, and subsequently slides, drops, or falls down the chute 64, e.g., as shown in FIG. 8. This allows a re-oriented object to be shifted to a subsequent location (e.g., a storage receptacle, conveyor, or other location) for further processing while being supported on its shortest and/or smallest dimensional side. The re-orienting of an object onto its shortest and/or smallest dimensional side is demonstrated to provide numerous benefits. For example, positioning an object, e.g., such as the object 68, on its shortest and/or smallest dimension side can allow for subsequent processing, e.g., shifting, organizing, and/or routing, of objects at a higher density (due to the smaller footprint occupied by the objects), and/or at a higher density particularly if a consistent selection of object sizes is used, e.g., as often is the case in a logistics network operation that transfers parcels, packages, and other transport receptacles.

Figure 5:
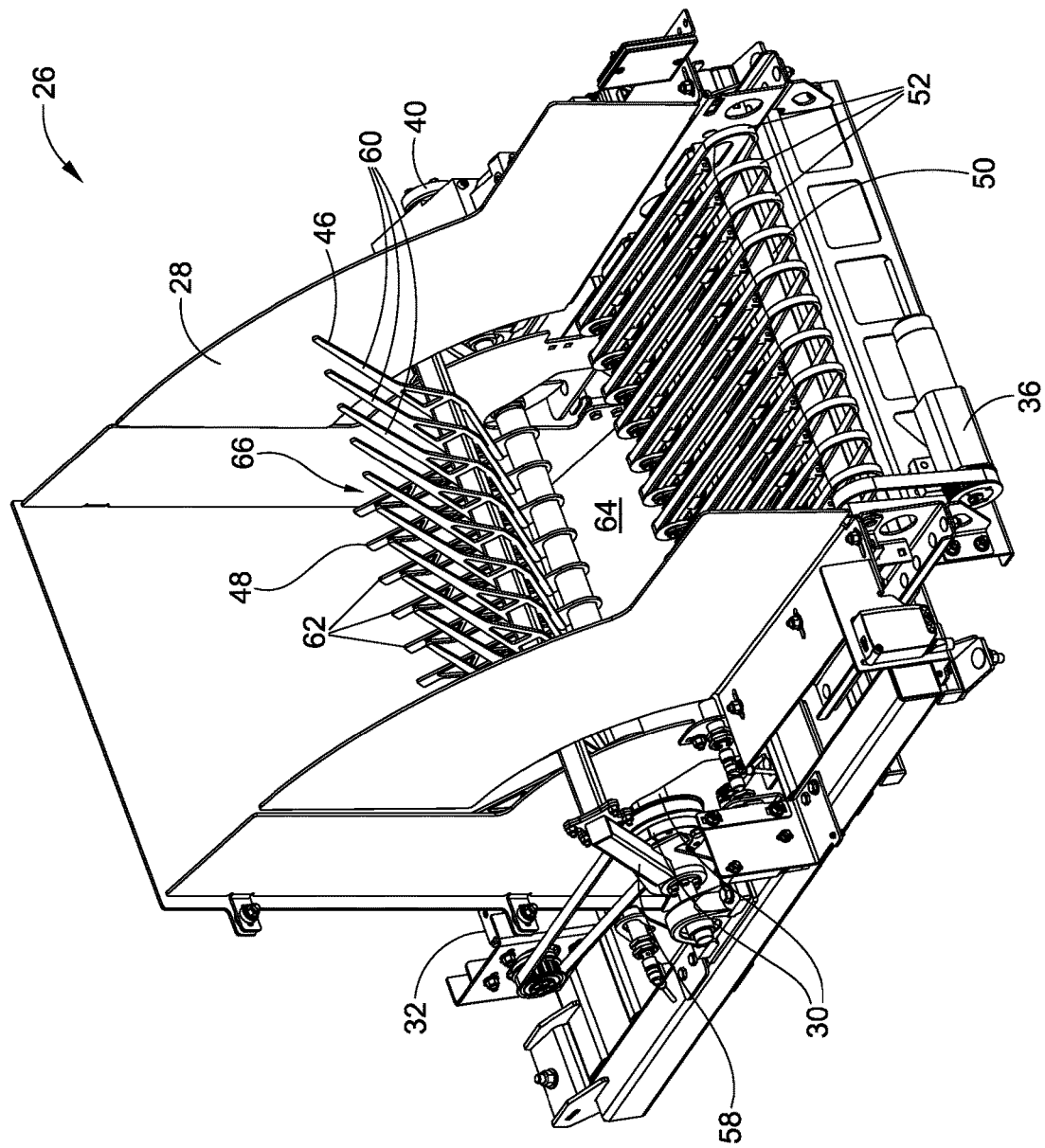
FIGS. 5-11 depict the object-orienting mechanism of FIG. 3 in a sequence of different operational configurations, in accordance with embodiments of the present disclosure.

Looking now at FIG. 5, the object-orienting mechanism 26 is again shown in a particular configuration, in accordance with an embodiment of the present disclosure. In particular, FIG. 5 shows the object-orienting mechanism 26 operated so that the pivoting-extension 46 is shifted, i.e., rotated, generally upward, and away from the shifting mechanism 50. In addition, the pivoting-extension 48 has been rotated independently of the pivoting-extension 46, so that the pivoting-extension 46 and fingers 60 thereof and the pivoting-extension 48 and fingers 62 thereof are positioned approximately perpendicular, or orthogonal, to each other. This generally forms a cradle 66 that supports an object being re-oriented, as discussed further in connection with FIGS. 6-11.

Looking now at FIGS. 6-11, the object-orienting mechanism 26 is shown in a sequence of different configurations, i.e., being used to shift, re-orient, and then deposit an object, in accordance with an embodiment of the present disclosure. FIGS. 6-11 look into the object-orienting mechanism 26 generally from one side with the housing 28 omitted for clarity, simplicity, and explanation.

Figure 6:
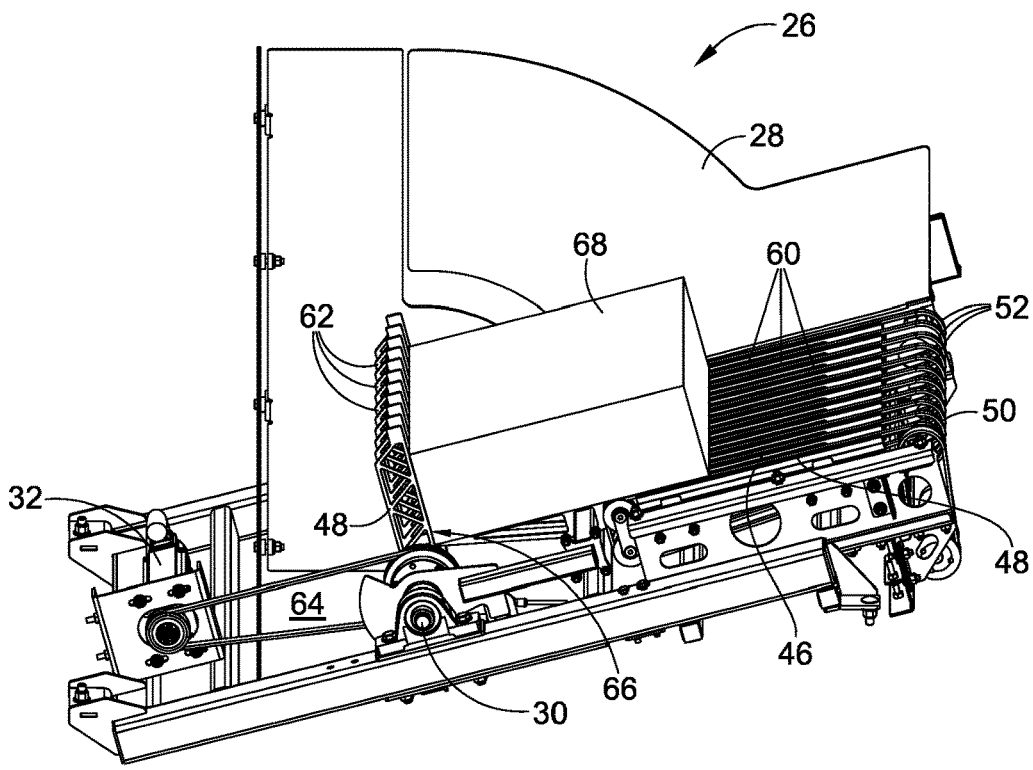

Looking at FIG. 6, an object 68 is shown being transferred along the shifting mechanism 50 such that the object 68 is shifted onto the fingers 60 of the pivoting-extension 46. In addition, the pivoting-extension 48 has been rotated on the pivot-assembly 30 so that the pivoting-extensions 46, 48 and the fingers 60, 62 thereof generally form the cradle 66 that supports the object 68. To achieve this configuration, the pivoting-extension 46 and/or the pivoting-extension 48 can be rotated independently using their respective actuators 32, 34.

Figure 7:
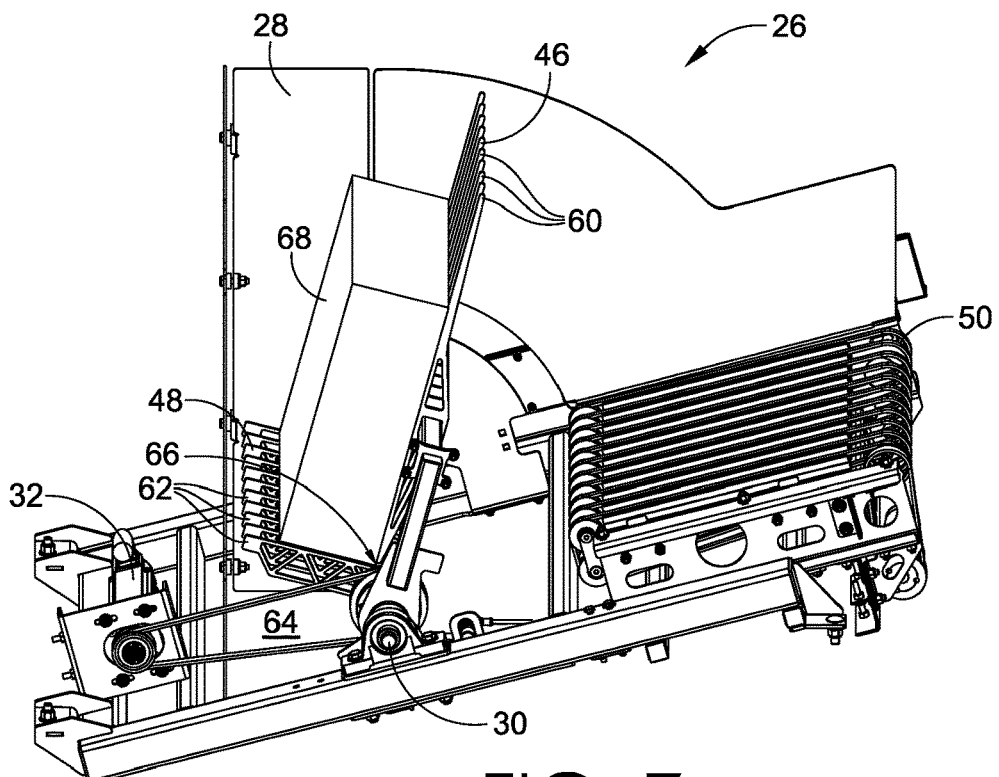

Looking now at FIG. 7, the object-orienting mechanism 26 is again shown, but in a different configuration. In FIG. 7, the pivoting-extension 46 and the pivoting-extension 48 have been rotated (e.g., independently) to form the approximately perpendicular configuration that provides the cradle 66 for the object 68, and also, the pivoting-extension 46 and the pivoting-extension 48 have been rotated (e.g., in unison) to shift the cradle 66 and the object 68 to a more upright rotational position. This upright position starts to support the object 68 on its shortest and/or smallest dimensional side, as shown in FIG. 7, and is closer to alignment with the chute 64 that extends through a bottom of the object-orienting mechanism 26.

Looking now at FIG. 8, the object-orienting mechanism 26 is again shown, but in a different configuration. In particular, in FIG. 8, the pivoting-extension 48 is rotated (e.g., independently) such that it is extended generally in an opposite-facing direction compared to the pivoting-extension 46. In other words, the pivoting-extensions 46, 48 and fingers 60, 62 thereof are extending away from each other to form a generally planar configuration. This planar configuration allows gravity to shift the object 68 along the pivoting-extensions 46, 48 and toward the chute 64. This configuration also generally eliminates the cradle 66, allowing the object 68 to slide, fall, and ultimately drop through the chute 64 from the force of gravity. The object 68 can then land, e.g., in a storage receptacle, on its shortest and/or smallest dimensional side, e.g., to facilitate processing with maximum density.

Figure 9:
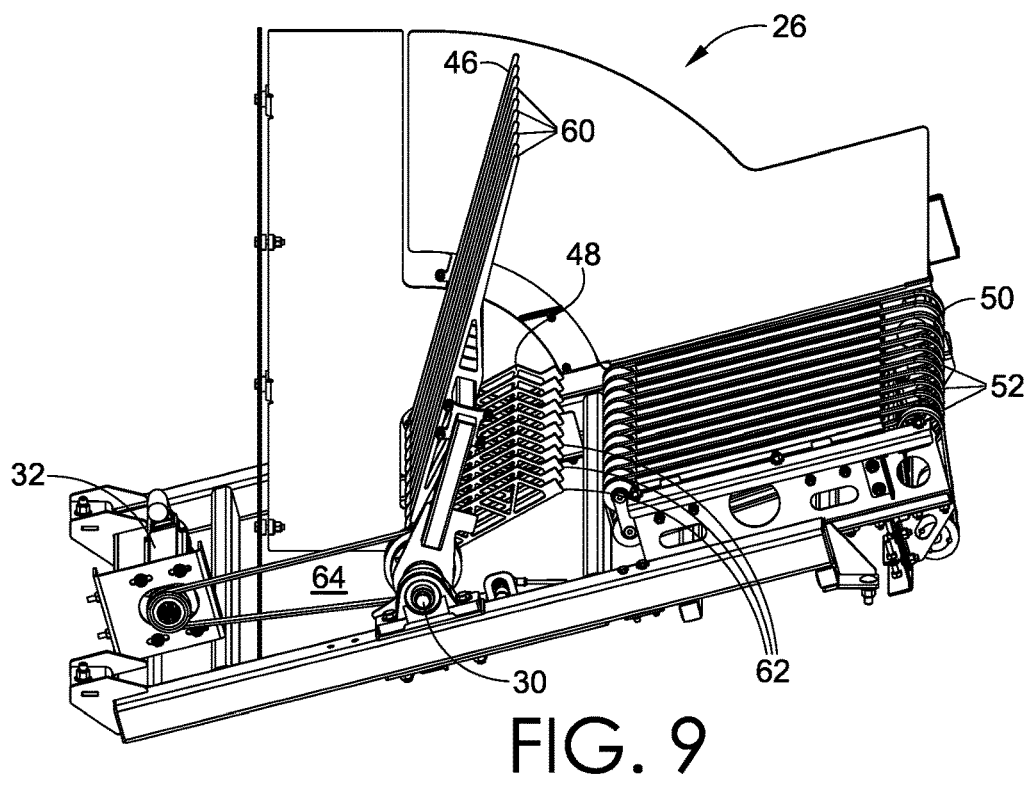

Looking now at FIG. 9, the object-orienting mechanism 26 is again shown, but in a different configuration. In particular, the object 68 is fully shifted off of the pivoting-extensions 46, 48, and down the chute 64. In addition, in FIG. 9, the pivoting-structure 48 has been rotated independently of the pivoting-structure 48 so that it transitions toward planar alignment with the pivoting-extension 46, e.g., in preparation for engaging and shifting another object, e.g., like the object 68.

Figure 10:
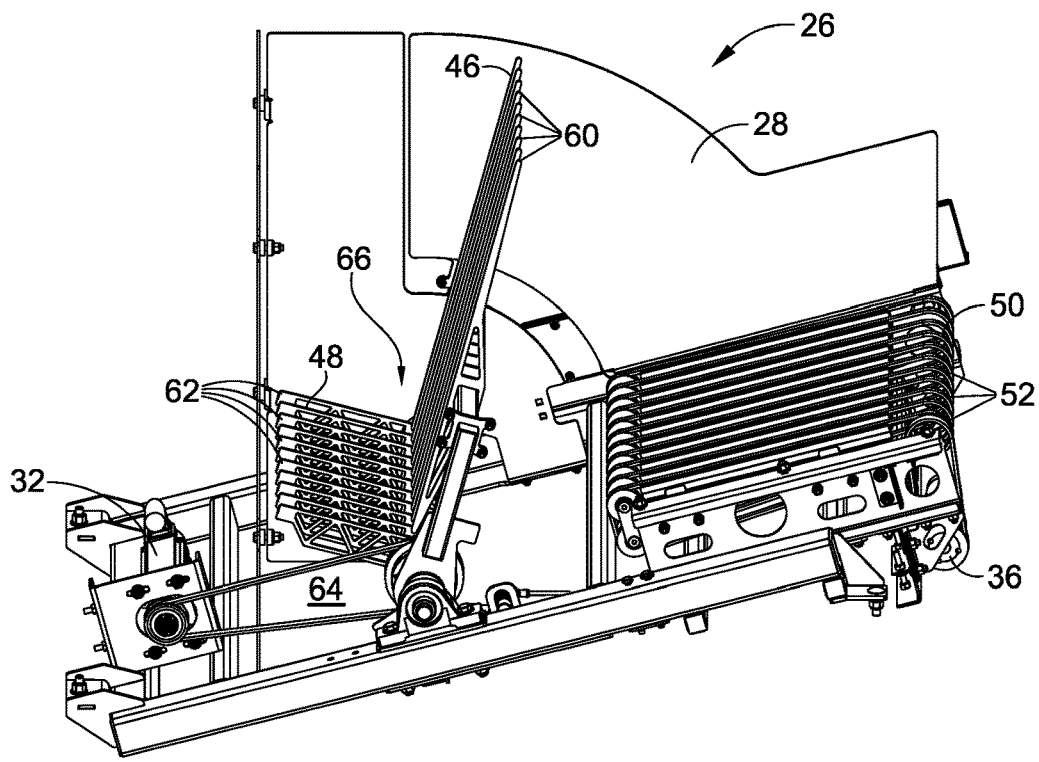

Looking now at FIG. 10, the object-orienting mechanism 26 is again shown, but in a different configuration. In particular, the pivoting-extension 48 has been rotated independently of the pivoting-extension 46 such that the pivoting-structure 46 and the pivoting-extension 48 again form the cradle 66. In particular, with FIG. 10, the pivoting-extension 48 has been rotated through the pivoting-extension 46 (which is possible due to the offset positioning of the fingers 60, 62). In this sense, the fingers 62 of the pivoting-extension 48 have been rotated through the fingers 60 of the pivoting-extension 46, so that the fingers 60 and the fingers 62 are adjusted into a substantially perpendicular configuration, forming the cradle 66. In the alternative, the fingers 62 can be pivoted in the opposite rotational direction to similarly form the cradle 66 without passing through the fingers 60 of the pivoting-extension 46.

Figure 11:
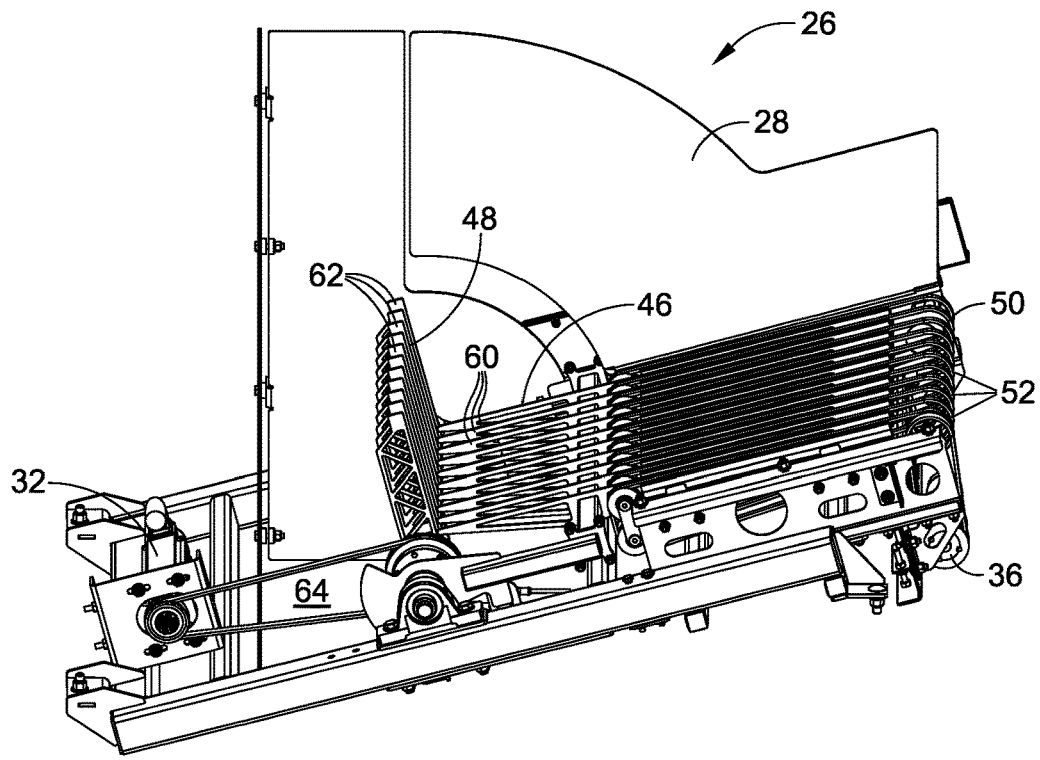

Looking now at FIG. 11, the object-orienting mechanism 26 is again shown, but in a different configuration. In particular, in FIG. 11, the pivoting-extension 46 and the pivoting-extension 48 are rotated (e.g., in unison) in their perpendicular configuration, so that the pivoting-extension 46 and the shifting mechanism 50 are aligned, or rather, are substantially co-planar. In this configuration, the fingers 60 and the transfer mechanisms 50 of the shifting mechanism are interposed, forming an alternating sequence across a common plane.

Looking now at FIGS. 12-15, a bin 70 for storing, transporting, and/or releasing objects is shown, in accordance with an embodiment of the present disclosure. The bin 70 shown in FIG. 12 can be used with a system for shifting objects, e.g., the system 10 shown in FIG. 2, or another system. The bin 70 can also be used in a logistics network operation. For example, the bin 70 can be used to transfer or route items such as parcels or packages (e.g., delivery boxes, bags, totes, or other transport receptacles) to their designated destinations, e.g., associated with a downstream location, and/or associated with a final, ultimate, and/or terminal destination of the parcels or packages. In addition, the bin 70 can be configured, operated, and/or used to hold objects that have been re-oriented to be supported on a side of smallest and/or shortest dimension. This can allow objects, e.g., parcels and packages, to be shifted in the bin 70 while occupying a smallest possible ground-area footprint. This can allow a greater density and thus volume of objects to be processed in a given area, among other benefits.

Figure 14:
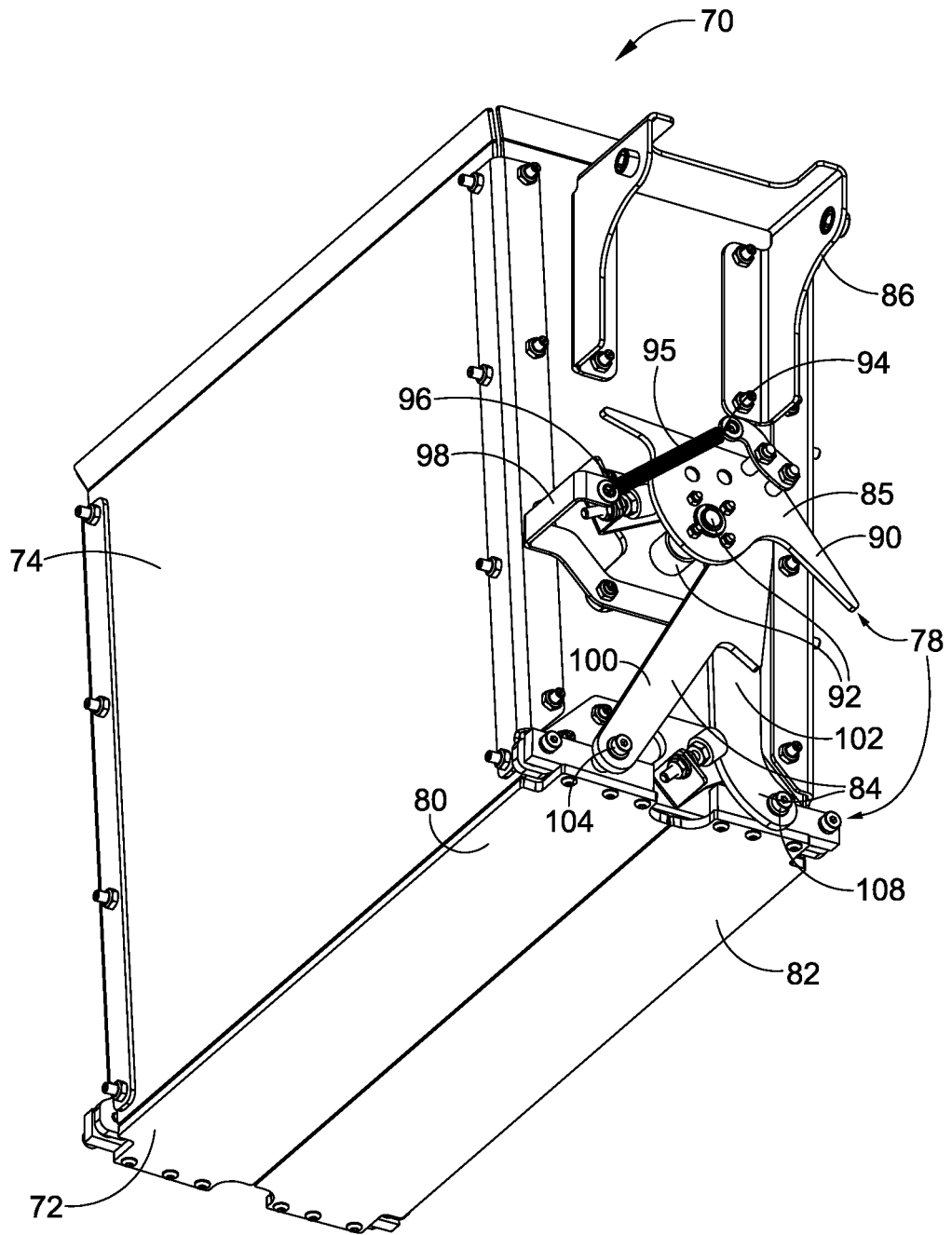
Figure 15:
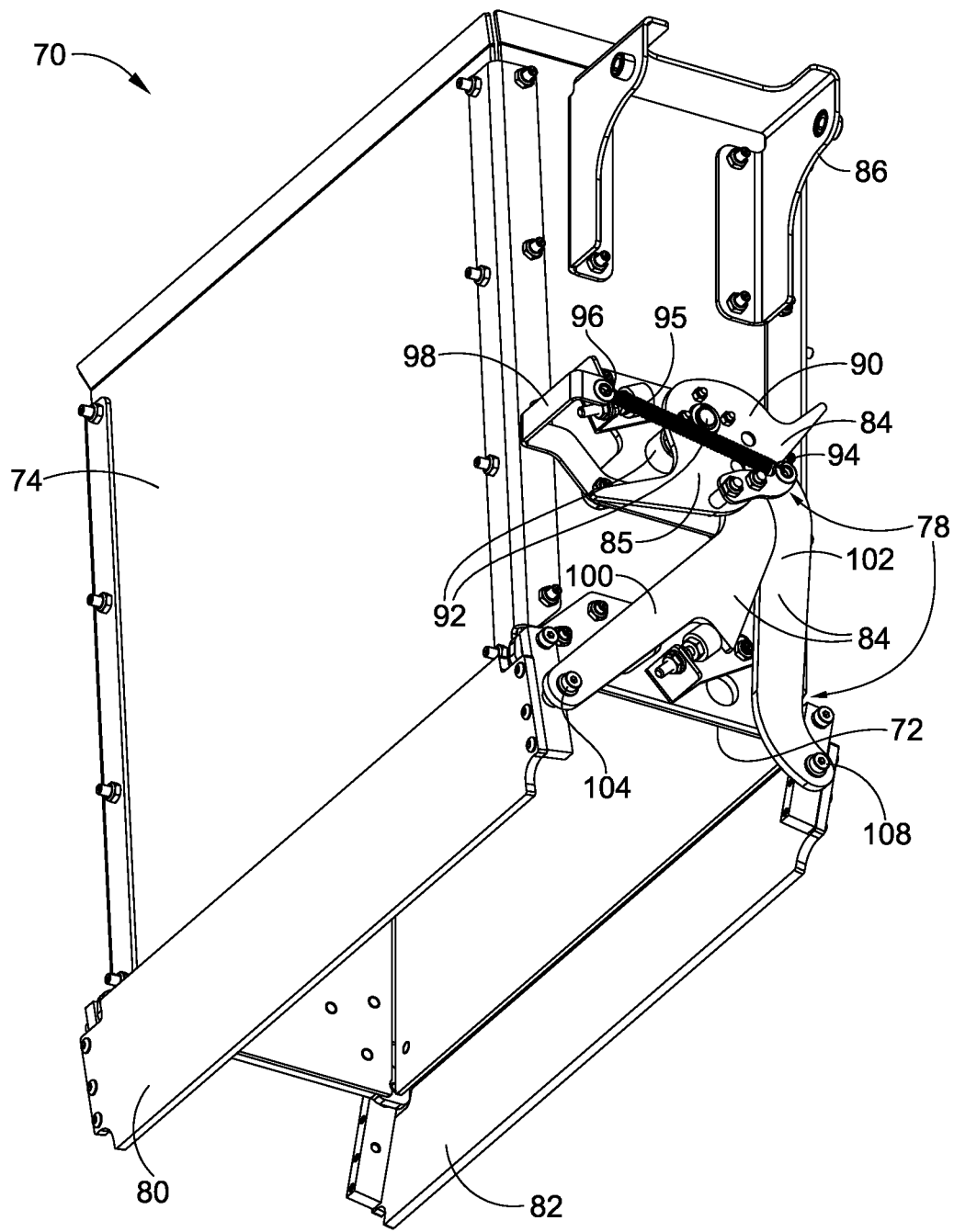

Looking still at FIGS. 12-15, the bin 70 includes a base 72. The bin 70 also includes at least one sidewall 74. The at least one sidewall 74 extends from the base 72 to an opening 76. The opening 76 is located generally at a top end of the bin 70. The bin 70 also includes a releasing mechanism 78. The releasing mechanism 78 is located generally at a bottom end of the bin 70 adjacent to the base 72. The releasing mechanism 78 is capable of supporting objects in the bin 70 in a closed configuration, e.g., as shown generally in FIGS. 12-14. The releasing-mechanism 78 is also capable of releasing or dropping objects from the bin 70 in an open configuration, e.g., as shown generally in FIG. 15. To enable this, the releasing mechanism 78 includes a pair of doors 80, 82. The doors 80, 82 are adjustable between the closed configuration, e.g., as shown generally in FIGS. 12-14, and the open configuration, e.g., as shown generally in FIG. 15. In one embodiment, the doors 80, 82 can be slidably mounted adjacent to the base 72, e.g., being mounted on tracks along which the doors 80, 82 can slide/translate. In another embodiment, the doors 80, 82 can be pivotally mounted adjacent to the base 72, e.g., being mounted on hinges that allow the doors 80, 82 to pivot, rotate, or otherwise rotationally displace (e.g., as depicted in FIG. 15). In another embodiment, the doors 80, 82 can be slidably and pivotally mounted adjacent to the base 72 of the bin 70, e.g., so that motion of the doors 80, 82 includes a combination of sliding and pivoting. FIGS. 12-15 depict an embodiment with a pair of doors 80, 82. However, in alternative embodiments, a releasing mechanism may include a different number of similar elements. For example, a releasing mechanism can include a single sliding and/or pivoting door, or can include more than two sliding and/or pivoting doors. Or, a releasing mechanism can include another configuration, e.g., a roller door, a sliding panel, a plurality of shutters, or other components that are pivoted, slid, or otherwise translated to allow objects to pass through.

The releasing mechanism 78 can be operated manually, mechanically, electrically, and/or pneumatically, and/or in automated and/or semi-automated fashion in different embodiments contemplated herein. For example, in different embodiments, the releasing mechanism 78 can be operated using one or more actuators, e.g., that are attached to the bin 70, or that are attached to a system, e.g., such as the system 10 shown in FIG. 2, such that the actuators and associated components interact with the releasing mechanism 78 at suitable points in time. The actuators in either configuration can be operated to open and close the doors 80, 82, e.g., through extending, retracting, pivoting, and/or otherwise adjusting structures that interact with the releasing mechanism 78. The aforementioned actuators can be connected to a control system, e.g., associated with a shifting system, e.g., the system 10 shown in FIG. 2, that directs operation of the actuators and associated structures. Example operations of such actuators are further discussed in connection with FIGS. 17A and 17B.

The bin 70 also includes a support-structure 86 and a support-structure 88. The support structures 86, 88 are located generally on opposite sides of the bin 70, e.g., being attached to the sidewall(s) 74 thereof. The support structures 86, 88 can be used to support the bin 70 during different operations, e.g., loading, shifting (e.g., along a track), and/or during a process of releasing objects from the bin 70. The general lateral positioning of the support structures 86, 88 allows the bin 70 to be supported while limiting interference with operation of the releasing mechanism 78. For example, the location of the support-structures 86, 88 can allow the doors 80, 82 to open and close substantially without interference. In different embodiments, a single support structure can be used to support the bin 70, or a plurality of support structures, e.g., 2, 3, 4, 5, 6, or more support structures, can be used to support the bin 70. In addition, in different embodiments, the support-structures 86, 88 may be fixed structures, or may be adjustable/operable, e.g., slidable, pivotable, rollable, and/or may be securable or lockable, e.g., to facilitate attachment and release of the bins 70 under different circumstances, e.g., loading and unloading of the bins 70, or other circumstances. In the embodiment depicted in FIGS. 12-15, the support-structure 86 is generally a rigid, fixed structure, and the support-structure 88 is generally a non-rigid or non-fixed structure, e.g., due to including a wheel 75. The wheel 75 (shown in FIG. 16) can be used to support the bin 70 by rolling along a surface, e.g., associated with a track, e.g., such as the track(s) 20 of the system 10 shown in FIG. 2.

Figure 12:
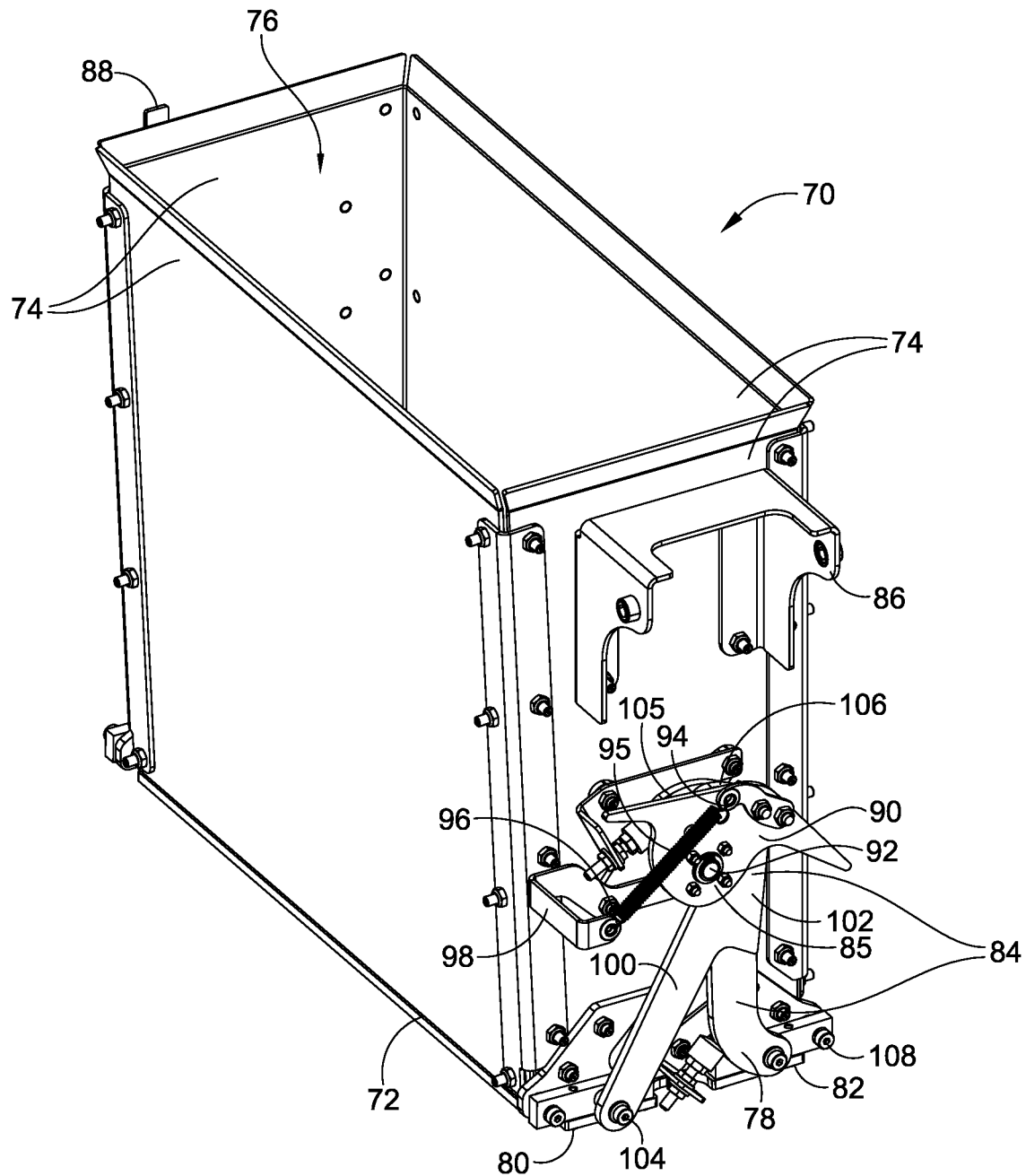
FIGS. 12-15 depict different perspectives of a bin used for supporting and releasing objects, in accordance with an embodiment of the present disclosure.
Figure 13:
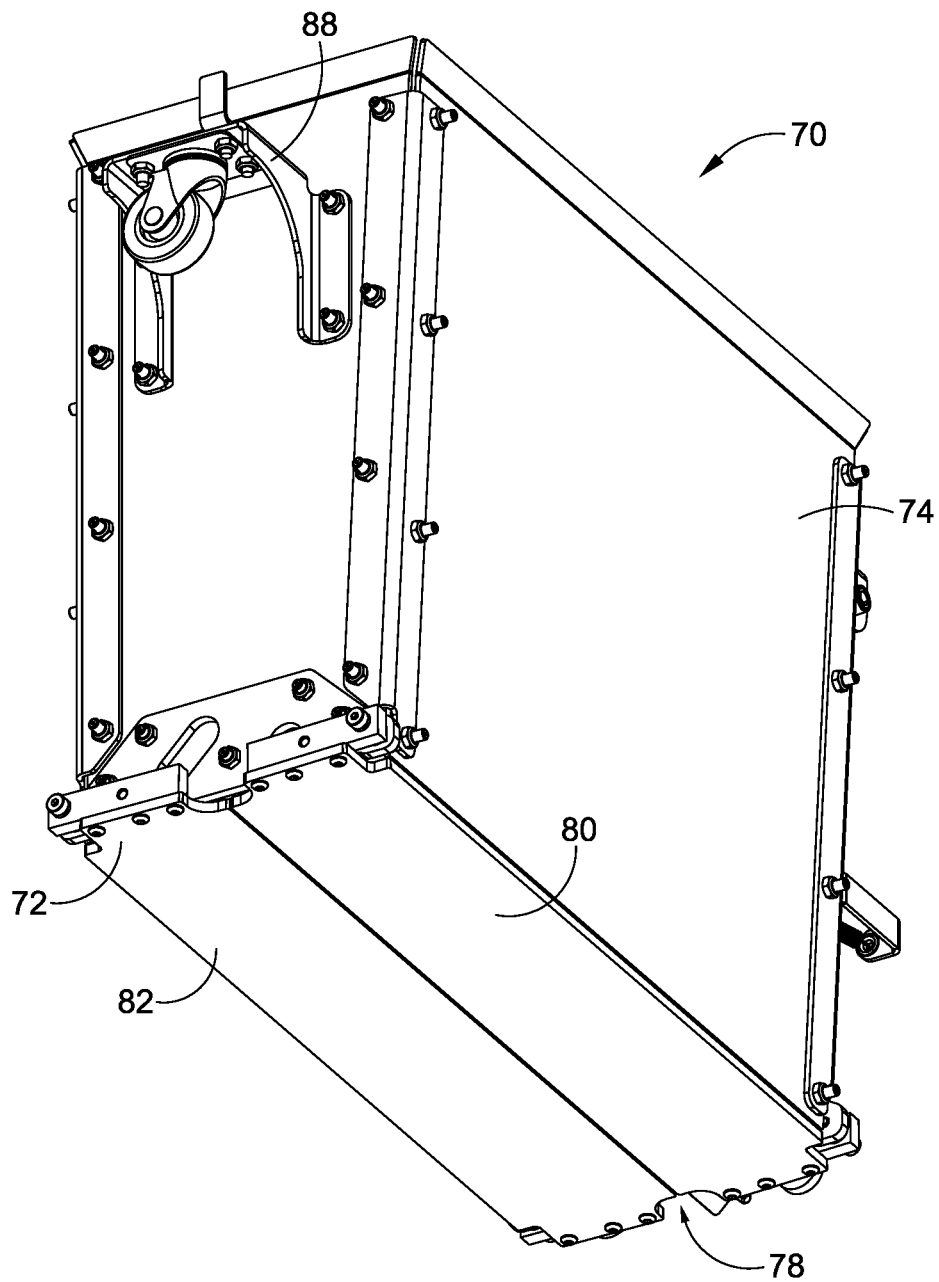

Looking still at FIGS. 12-15, it can be seen that the releasing mechanism 78 includes a pivot-mechanism 85. The pivot-mechanism 85 includes a cam plate 90 that is pivotally coupled to a linkage 84 that is pivotally coupled to the doors 80, 82. The cam plate 90 is mounted on a pivot-connection 92 attached to the sidewall(s) 74 of the bin 70. This configuration allows the cam plate 90 to rotate on the pivot-connection 92. The pivot-mechanism 85 also includes a spring 95. The spring 95 extends between a spring-connection 94 located on the cam plate 90 and a spring-connection 96 located on a bracket 98 that is attached to the sidewall(s) 74 of the bin 70. Thus, with this configuration, pivoting of the cam plate 90 as shown in FIG. 15 increases tension on the spring 95, thereby biasing the cam plate 90 back to its resting position, e.g., as generally shown in FIG. 12.

The linkage 84 shown in FIGS. 12, 14, and 15 includes an assembly of components that can shift in coordination to either open the doors 80, 82, or close the doors 80, 82, depending on the direction of rotation of the cam plate 90. To enable this, one end of the linkage 84 is pivotally coupled to the cam plate 90, and the other end of the linkage 84 is pivotally coupled to the doors 80, 82. Thus, the rotational position of the cam plate 90 corresponds to a position of the doors 80, 82, e.g., open or closed. The position of the cam plate 90 shown in FIG. 15 corresponds to the doors 80, 82 being generally open. The position of the cam plate 90 in FIG. 12 corresponds to the doors 80, 82 being generally closed.

Looking still at FIGS. 12, 14, and 15, the linkage 84 includes an arm 100. The arm 100 is coupled to a pivot-connection 104 on the door 80. The arm 100 is also coupled to a pivot-connection 106 on the cam plate 90, as shown in FIG. 12. The pivot-connection 106 is partially obscured in FIG. 12, but it is generally located between the cam plate 90 and the sidewall(s) 74 of the bin 70. The linkage 84 also includes an arm 102. The arm 102 is pivotally coupled to a pivot-connection 108 on the door 82. The arm 102 is also coupled to a pivot-connection 105 on the cam plate 90. The pivot-connection 105 is partially obscured in FIG. 12, but is generally located between the cam plate 90 and the sidewall 74. The pivot-connections 105, 106 may be connected to the cam plate 90 at spaced-apart locations, or may be connected to the cam plate 90 at a common location. In either configuration, when the releasing mechanism 78 is operated, the cam plate 90 is rotated, shifting the linkage 84 such that the arms 100, 102 apply a force to the doors 80, 82 that opens them, e.g., as shown in FIG. 15. In this position, the spring 95 is extended, and thus is biasing the cam plate 90, such that once the releasing mechanism 78 is no longer operated, the cam plate 90 rotates back to its original position causing the linkage 84 to shift, thereby closing the doors 80, 82, e.g., as shown in FIG. 12.

Looking now at FIGS. 16, 17A-17B, 18A-18B, and 19A-19B, a system 110 for shifting, re-orienting, and loading objects, e.g., parcels and packages, is shown, in accordance with an embodiment of the present disclosure. In some embodiments, the system 110 may form part of a larger overall system, e.g., the system 10 shown in FIG. 2, among others. The system 110 is depicted with some components omitted for clarity and explanation purposes. In addition, FIGS. 16-19B show the system 10 performing a sequence of operations, e.g., shifting, re-orienting, and depositing objects in storage receptacles, e.g., in furtherance of routing the objects to a downstream location, as described further below.

The system 110 includes the object-orienting mechanism 26, e.g., as described in connection with FIGS. 3-11. The system 110 also includes the object-supply mechanism 14 (with some elements omitted for clarity), e.g., as described in connection with FIG. 2. In addition, the system 110 includes a plurality of the bins 70, e.g., as described in connection with FIGS. 12-15.

The bins 70 are mounted on the track(s) 20. This allows the bins 70 to shift around the system 110 on the track(s) 20. The track(s) 20 include at least one belt 112 extended over a plurality of rollers 113 (which may be driven by rotational actuators). The track(s) 20 also includes a plurality of support structures 114 (a limited selection of which is shown in FIGS. 16, 17A-17B, and 18A-18B for clarity purposes). The support structures 114 are attached to the belt 112 in spaced-apart relation, or rather, in a spaced-apart sequence. The support structures 86 on one side of the bins 70 are coupled to the support structures 114 on the belt 112. This allows the bins 70 to be shifted in a sequence by the belt 112. The support structures 88 on the other sides of the bins 70 are supported on the track(s) 20. In particular, the wheels 75 of the support structures 88 are able to roll along the track(s) 20, thereby supporting the other side of the bins 70. This support configuration allows the bins 70 to remain in an upright orientation, e.g., during loading, shifting, and releasing of objects.

Figure 17A:
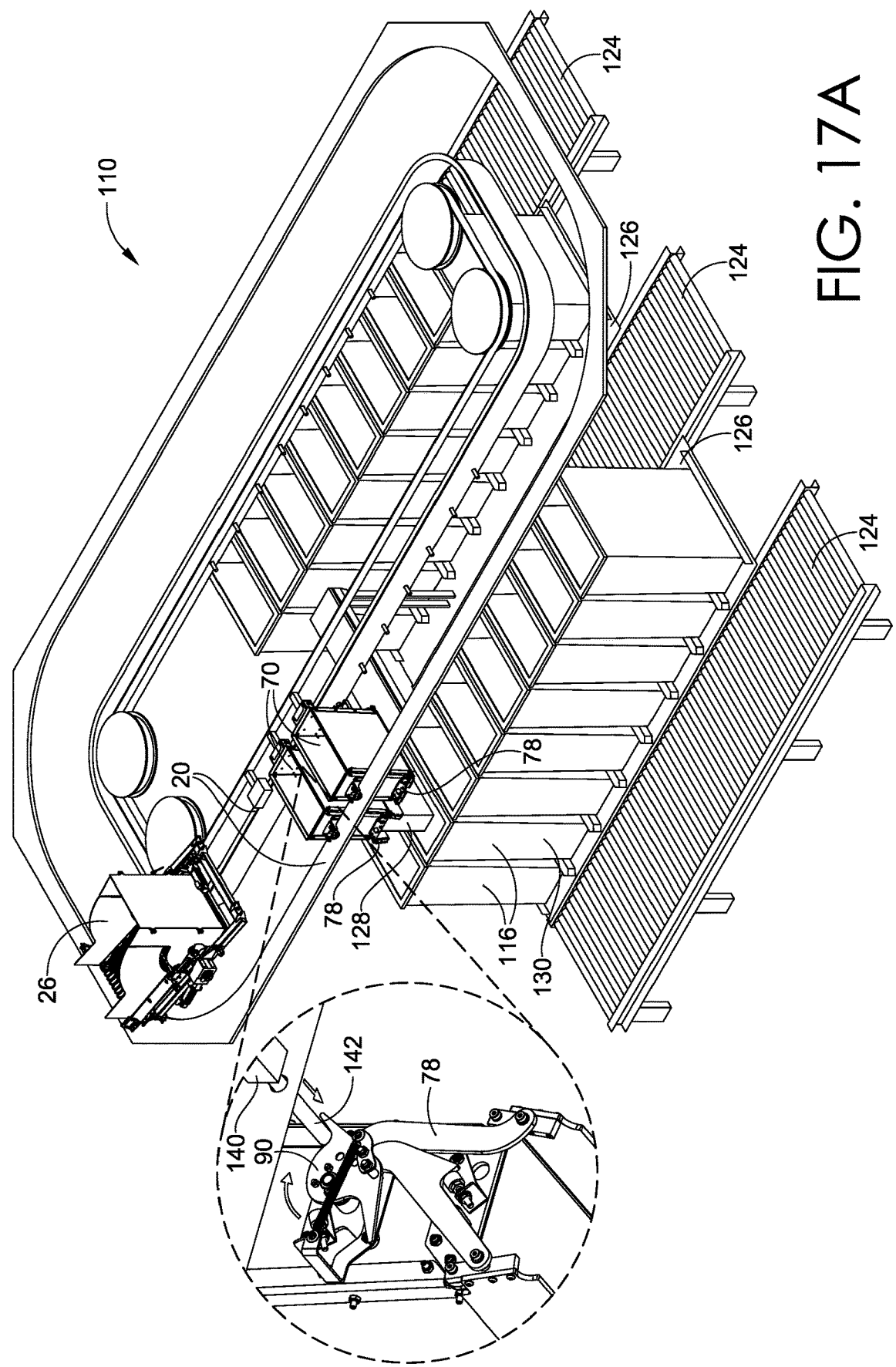
FIGS. 17A-17B depict the system of FIG. 16 showing the operation of a releasing mechanism on a bin, in accordance with an embodiment of the present disclosure.
Figure 17B:
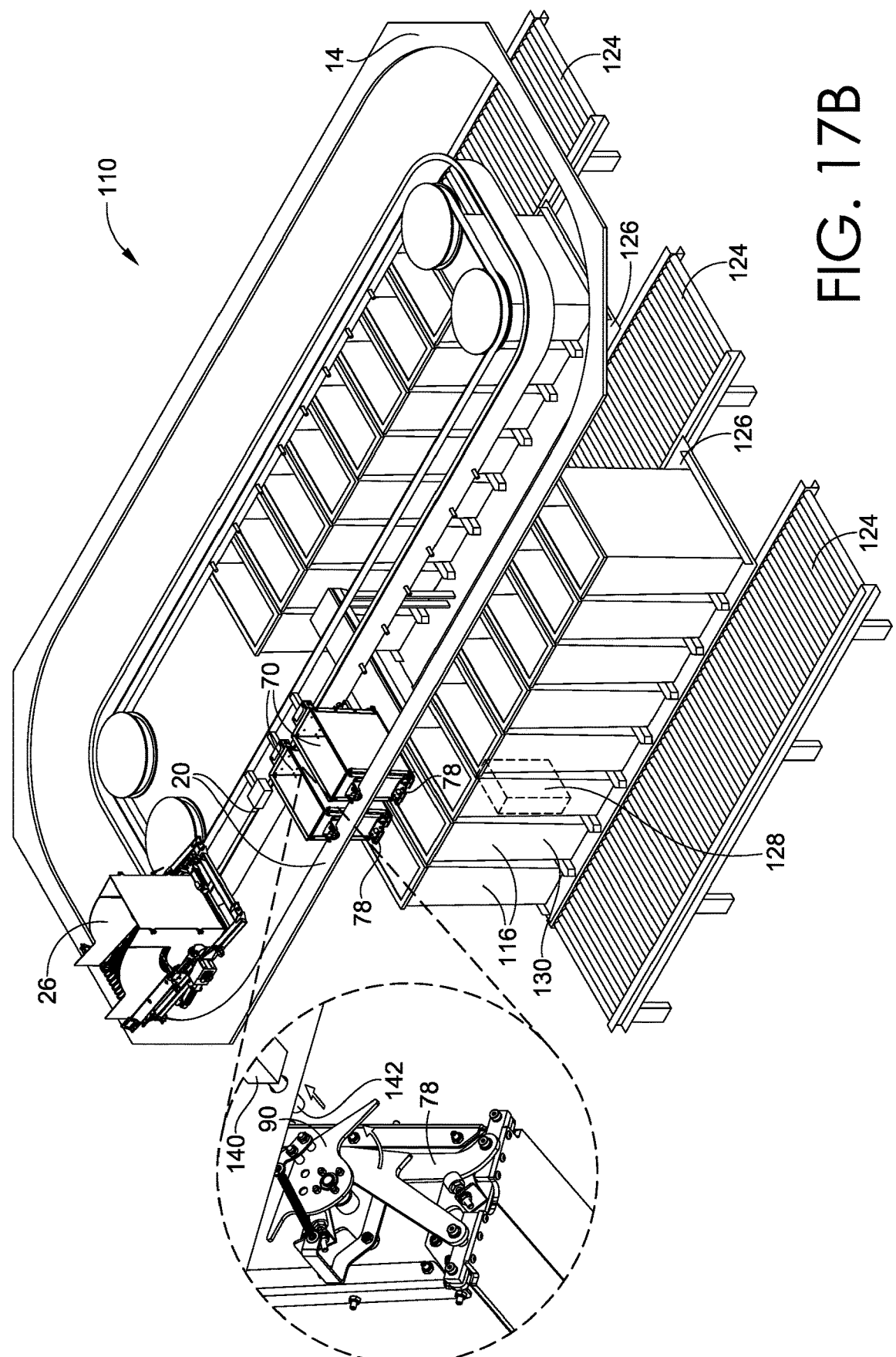
Figure 18A:
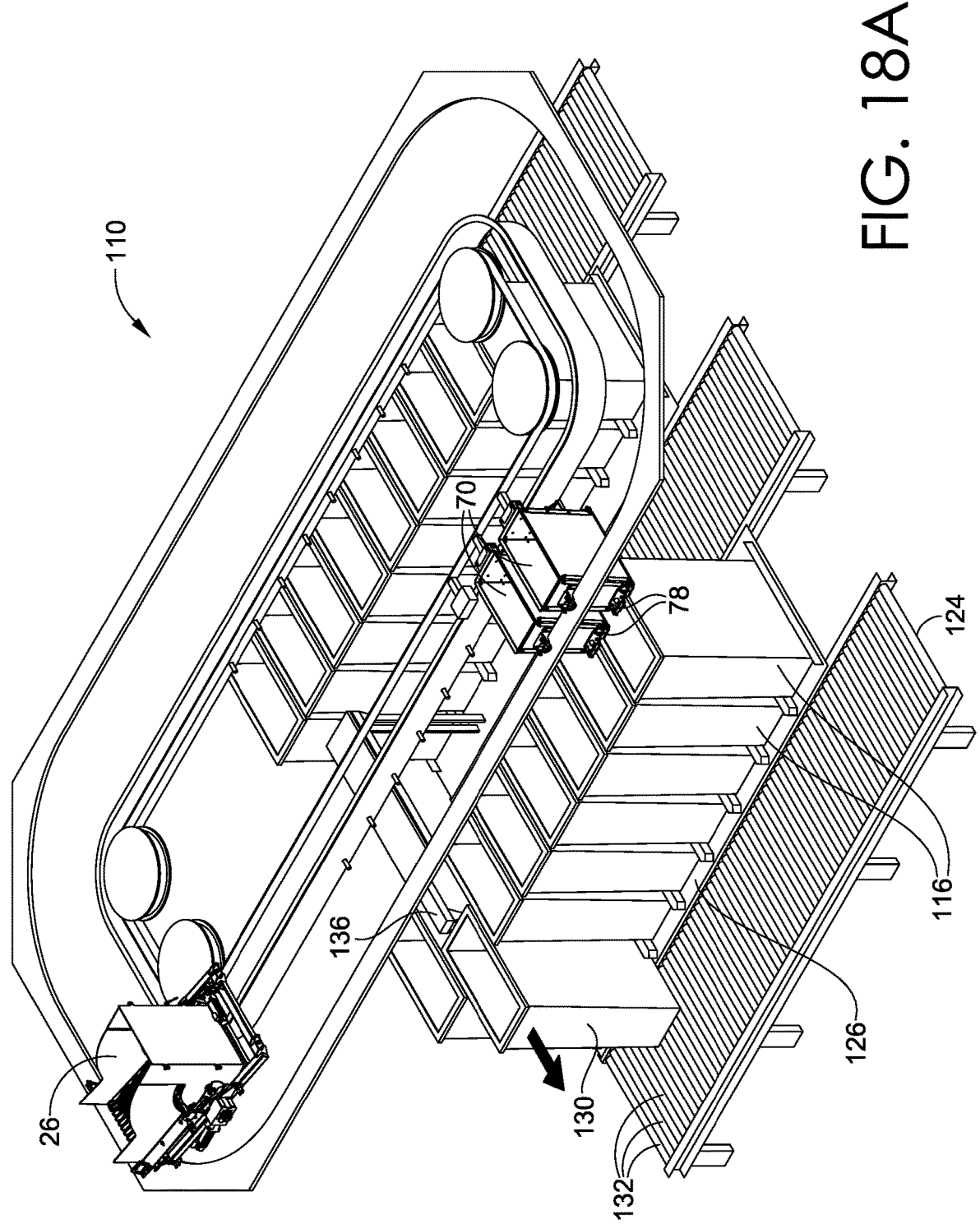
FIGS. 18A-18B depict the system of FIG. 16 with a pusher-mechanism being used to shift a container onto a track, in accordance with an embodiment of the present disclosure.

The system 110 includes a plurality of containers 116. The containers 116 each include a base 118, at least one sidewall 120, and an opening 122. The opening 122 is alignable with the releasing mechanism 78 at the bottom of each bin 70. Thus, as a bin 70 is shifted over a container 116, and the releasing mechanism 78 is aligned with the opening 122 of the container 116, the releasing mechanism 78 can then be shifted into an open configuration that allows objects in the bin 70 to drop into the container 116. The containers 116, once loaded, can then be shifted from a support structure 126 onto a track 124 that is adjacent to the support structure 126. The track 124 can be a passive track, an active track, or a combination thereof. For example, in different embodiments, the track 124 can include a conveyor mechanism, or can include a plurality of rollers, e.g., that are powered with rotational actuators, or can include other mechanisms that facilitate shifting of loaded containers 116, e.g., as shown in FIG. 18A. In an alternative embodiment, the containers 116 may be omitted, and objects may simply be dropped onto a track, conveyor, or similar mechanism, e.g., for downstream processing. In another alternative embodiment, the generally movable container 116 can be replaced with a static container that includes a releasing mechanism (e.g., one that can shift between a closed, object-supporting configuration and an open, object-releasing configuration) at its base. For example, the releasing mechanism can include at least one door that is manually opened and closed, or that is opened and closed through operation of an associated actuator. The static container, instead of being displaced and then shifted downstream as discussed in connection with FIGS. 16-19B, can remain substantially in place until a set number of objects have been deposited in the static container. These deposited objects can then be released from the static container through operation of the associated releasing mechanism. The released objects can then fall onto another shifting mechanism (e.g., a belt-driven conveyor) as a group that is then shifted to a downstream location for further processing (e.g., sorting, bagging, packaging, labeling, scanning, and/or further routing, among other things). This alternative configuration can also be implemented throughout the system 10 shown in FIG. 2.

Figure 16:
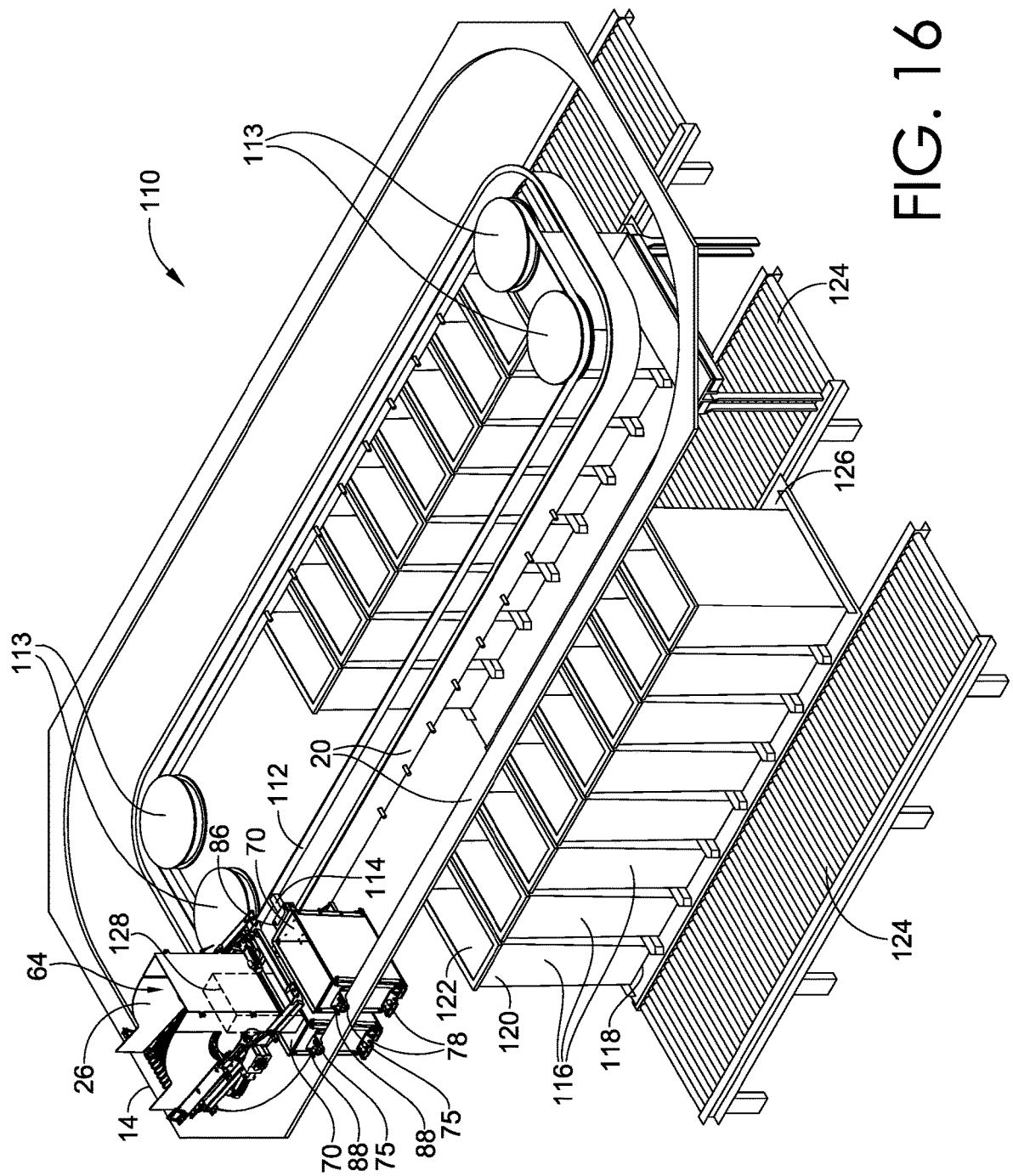
FIG. 16 depicts part of a system used for transferring objects for subsequent shifting, processing, and/or routing, in accordance with an embodiment of the present disclosure.

In FIG. 16, an object 128 is positioned on the object-orienting mechanism 26. In a logistics network operation, the object 128 may be a parcel or package that is being routed to a particular destination, e.g., one downstream in the logistics network, or one associated with a final, ultimate delivery destination, e.g., such as a recipient location. The object 128 may be a substantially structured object, e.g., a box, bin, container, or other storage element that maintains a substantially fixed geometry. Or, the object 128 can be an unstructured or partially unstructured object, e.g., a bag, soft-sided tote, or other storage receptacle that does not maintain a substantially fixed geometry, i.e., it can at least partially change shape. In different embodiments, the system 110 and components thereof can be configured to handle either form of such objects, or both, during a shifting operation.

Looking still at FIG. 16, it can be seen that the object 128, having been introduced into the object-orienting mechanism 26 by the object-supply mechanism 14, has been re-oriented, e.g., into an upright orientation, with the shortest and/or smallest dimensional side oriented downward. This aligns the object 128 for insertion into the bin 70. The bin 70 can be size to hold the object 128 while resting on its shortest and/or smallest dimensional side. This shortest and/or smallest dimensional side can correspond with a cross-sectional area of the bin 70, so that objects of a range of different dimensions can fit into the bin 70, as long as the shortest and/or smallest dimensional side of the objects fits into the bin 70. This allows the system 110 to process objects of different dimensions all while using a smallest possible surface area, or ground-footprint, due to the objects being shifted on the shortest and/or smallest dimensional side. This can allow a greater number of objects to be processed in a given space, and/or allow the speed, efficiency, and/or through-put of systems that process objects to be increased, and/or maximized, among other benefits.

In FIG. 16, the object-orienting mechanism 16 is adjusted so that the re-oriented object 128 is released through the chute 64 into the bin 70 that is located underneath the object-orienting mechanism 16. During this transfer, the releasing mechanism 78 on the bin 70 is in the closed configuration so that it supports the deposited object 128. FIGS. 17A-17B depict how the bin 70 is then shifted along the track(s) 20 and across the sequence of containers 116. The containers 116, like the object 128, can be associated with particular destinations, e.g., downstream locations in a logistics network, or routes in a logistics network. As shown in FIGS. 17A-17B, the bin 70 is eventually shifted into position above a container 116 that is associated with a routing of the object 128 stored in the bin 70. This can be determined by a control system, e.g., the control system 15 described in connection with FIG. 2, that operates in connection with the system 110. For example, the control system can monitor the locations of the object 128, the bins 70, and the containers 116 and coordinate transfer based on routing information stored in memory. The locations and identities of the objects, bins, and containers can be tracked using different techniques, e.g., through scanning of tracking indicia, e.g., such as machine-readable indicia, through image-recognition, through radio-frequency identification ("RFID"), or through other forms of tracking.

Looking now at FIGS. 17A and 17B, a process of actuating the releasing mechanisms 78 on the bins 70 in order to release objects, e.g., the object 128, into the containers 116 positioned below is shown, in accordance with an embodiment of the present disclosure. In FIGS. 17A and 17B, the bins 70 are being shifted along the track(s) 20. Included in the system 110, e.g., positioned along the track(s) 20, are linear actuators 140 with corresponding structures 142 (e.g., pins, cylinders, or similar elements) that are extendable and retractable. Thus, as the bins 70 are shifted along the track(s) 20, and as a bin 70 reaches a point where an object should be released from the bin 70 into a container 116, the system 110 can operate the appropriate linear actuator 140, extending its structure 142 into contact with the cam plate 90 on the releasing mechanism 78, e.g., as shown in FIG. 17A. This operates the releasing mechanism 78 (e.g., opening the doors 80, 82), releasing the object 128 into the below container 130, e.g., as shown in FIG. 17A. The system 110 then operates the linear actuator 140 to retract the structure 142, so that the bins 70 can then pass by that location on the track(s) 20 without the releasing mechanisms 78 being operated, e.g., as shown in FIG. 17B.

Figure 18B:
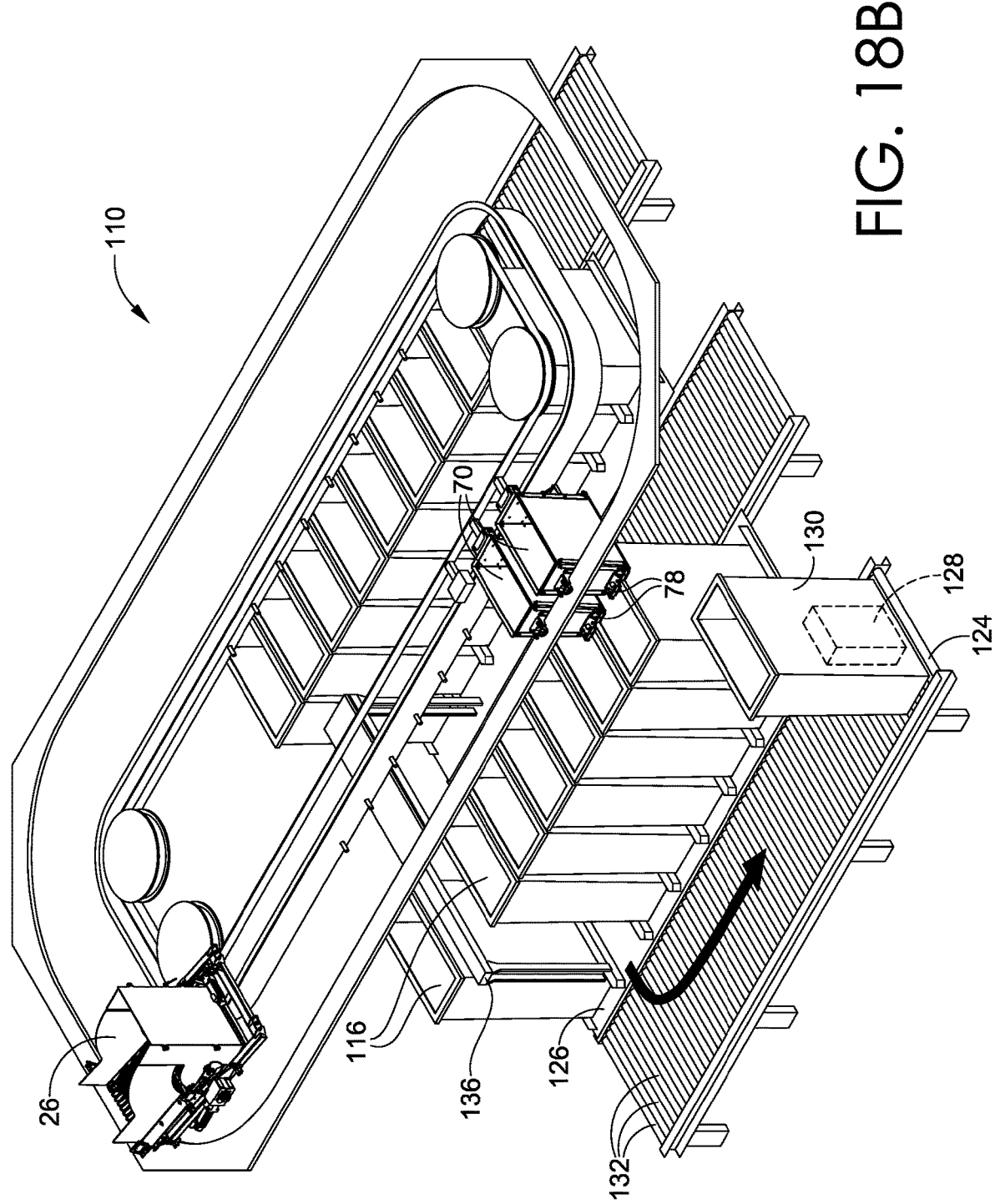

Looking now at FIG. 18A, the object 128 has been deposited into the container 130, and the container 130 is being shifted onto the track 124, for further routing of the object 128 and container 130. This shifting of the container 130 can be performed by a mechanism that is operable to translate the containers 116 laterally outward from the track(s) 20, and onto the track 124. For example, in FIGS. 18A-18B, a pusher-mechanism 136 (e.g., one that is electrically, mechanically, pneumatically, and/or hydraulically operated) is shifted into contact with the container 130 such that it pushes the container 130 out onto the track 124, as shown in FIG. 18B. In one embodiment, the pusher-mechanism 136 is shiftable along a length of the track(s) 20, so that its shiftable components can be used to displace different containers 116 along the length of the track(s) 20. In other embodiments, multiple pusher-mechanisms can be positioned along the length of the track(s) 20 for use in displacing different containers 116. The operation of the pusher-mechanism 136 can be directed by a control system associated with the system 110.

FIG. 18B shows the container 130 displaced by the pusher-mechanism 136 and being transferred along the track 124. The track 124 includes rollers 132. The rollers 132 can be passive or powered. For example, the rollers 132 can be rotated by actuators, e.g., to facilitate transferring of the container 130 down the track 124 toward a downstream location, e.g., for further processing. For example, the container 130 with the object 128 may travel to a location where another object is loaded, or where the object 128 is removed, transferred, and further processed using other components associated with the system 110, e.g., a container-flipping mechanism 134 as shown in FIGS. 19A and 19B.

Figure 19A:
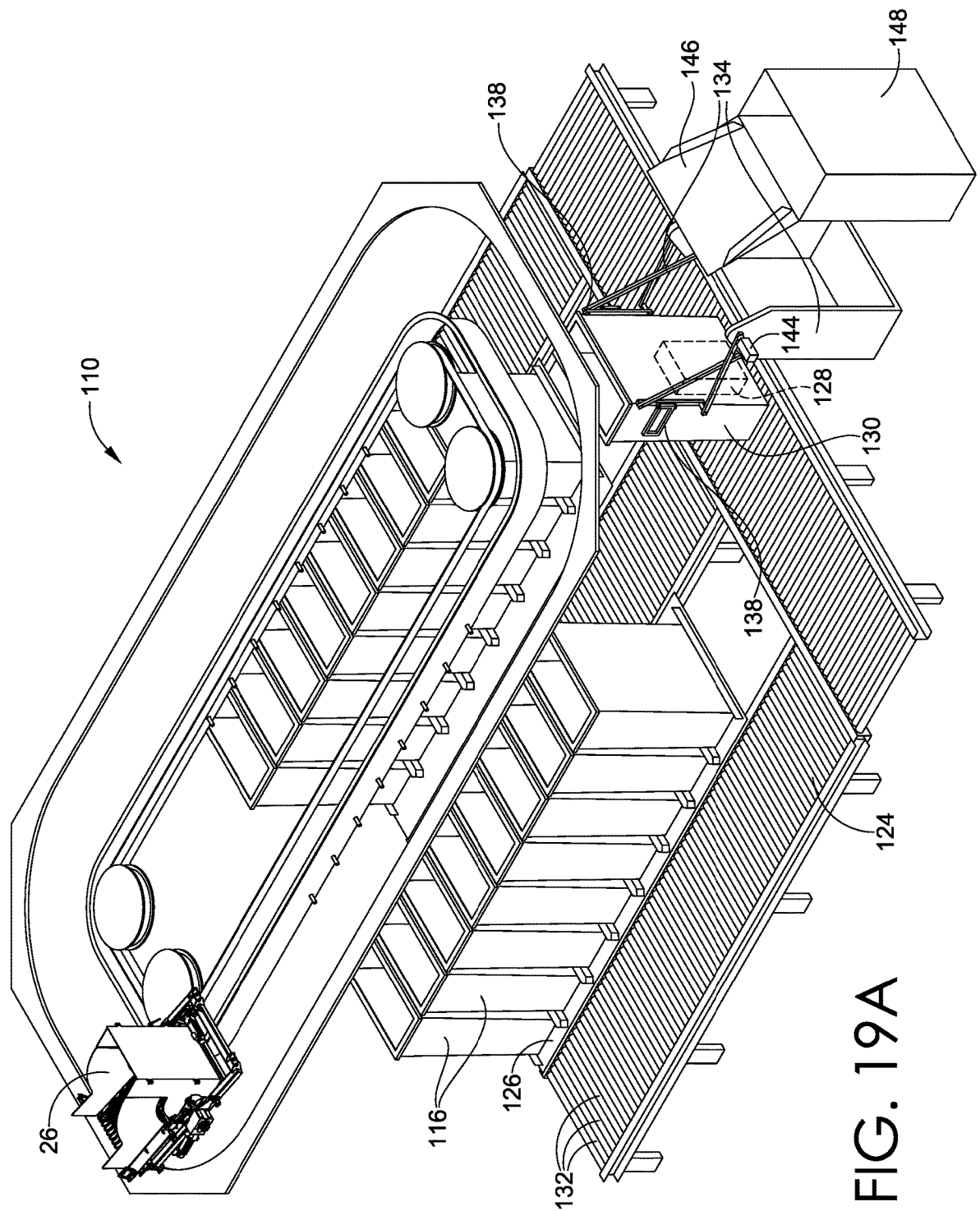
FIGS. 19A-19B depict the system of FIG. 16 along with a container-flipping mechanism that is used to transfer objects, in accordance with an embodiment of the present disclosure.
Figure 19B:
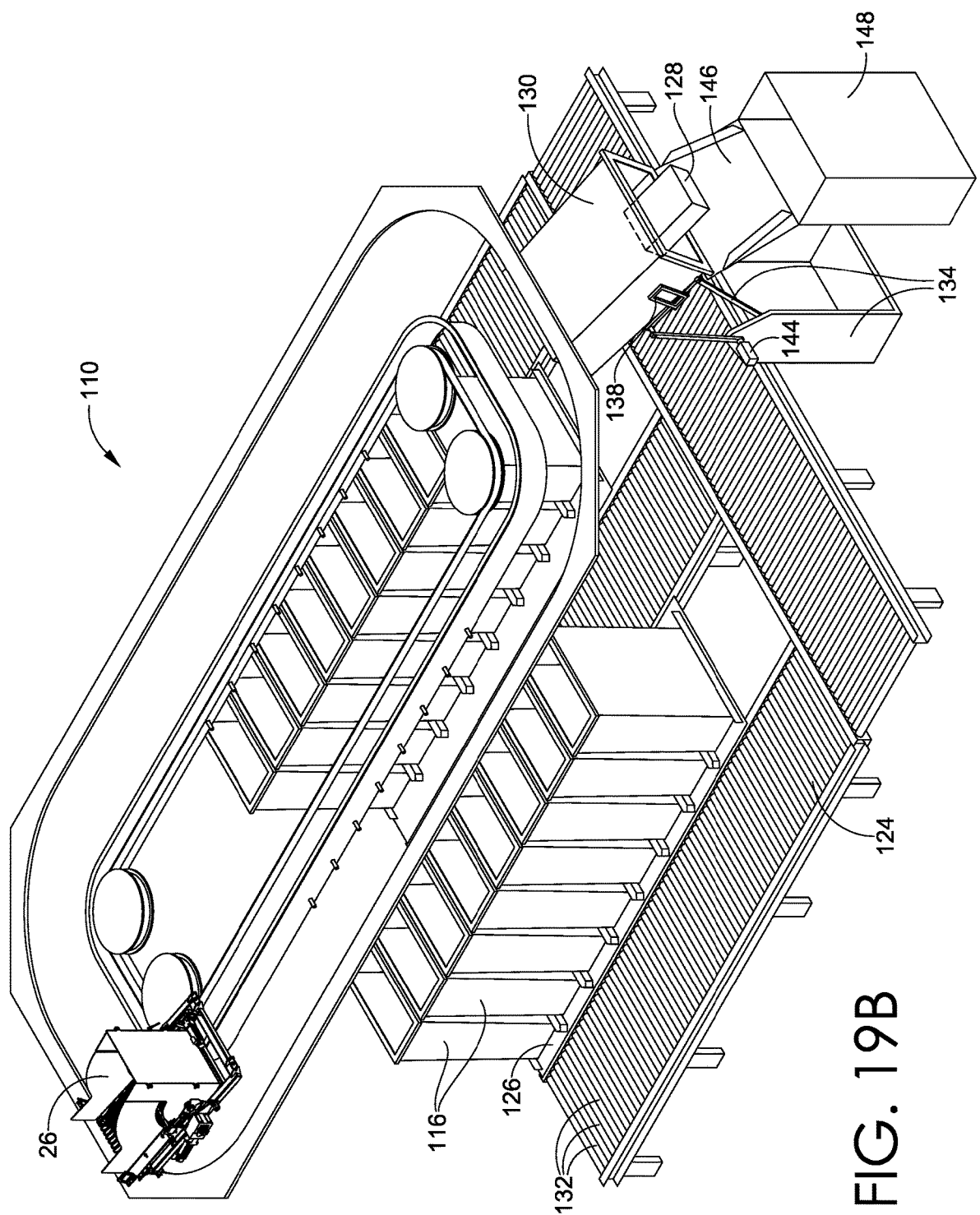

Looking now at FIGS. 19A and 19B, the system 110 is again shown, but with a container-flipping mechanism 134 located at the end of the track 124, in accordance with an embodiment of the present disclosure. The container-flipping mechanism 134 can be used in coordination with the system 110, e.g., to engage, lift, and flip containers 116 to displace the objects loaded therein from the bins 70 for further shifting, sorting, and/or routing, among other things. For example, the container-flipping mechanism 134 may be located at a downstream location where the container 130 with the object 128 is subsequently transferred as shown in FIGS. 19A and 19B. The container-flipping mechanism 134 includes a frame 138 that is shaped to receive, and support, the container 130 as shown in FIGS. 19A and 19B. In addition, the container-flipping mechanism 134 includes an actuator assembly 144 that allows the supported container 130 to be lifted, rotated, and oriented such that the object 128 can be ejected, e.g., down a chute 146 adjacent to the container-flipping mechanism 134. The chute 146 may allow objects to be deposited at a subsequent location, e.g., into another container 148 as shown in FIGS. 19A and 19B, or onto another mechanism, e.g., such as a conveyor.

Figure 20:
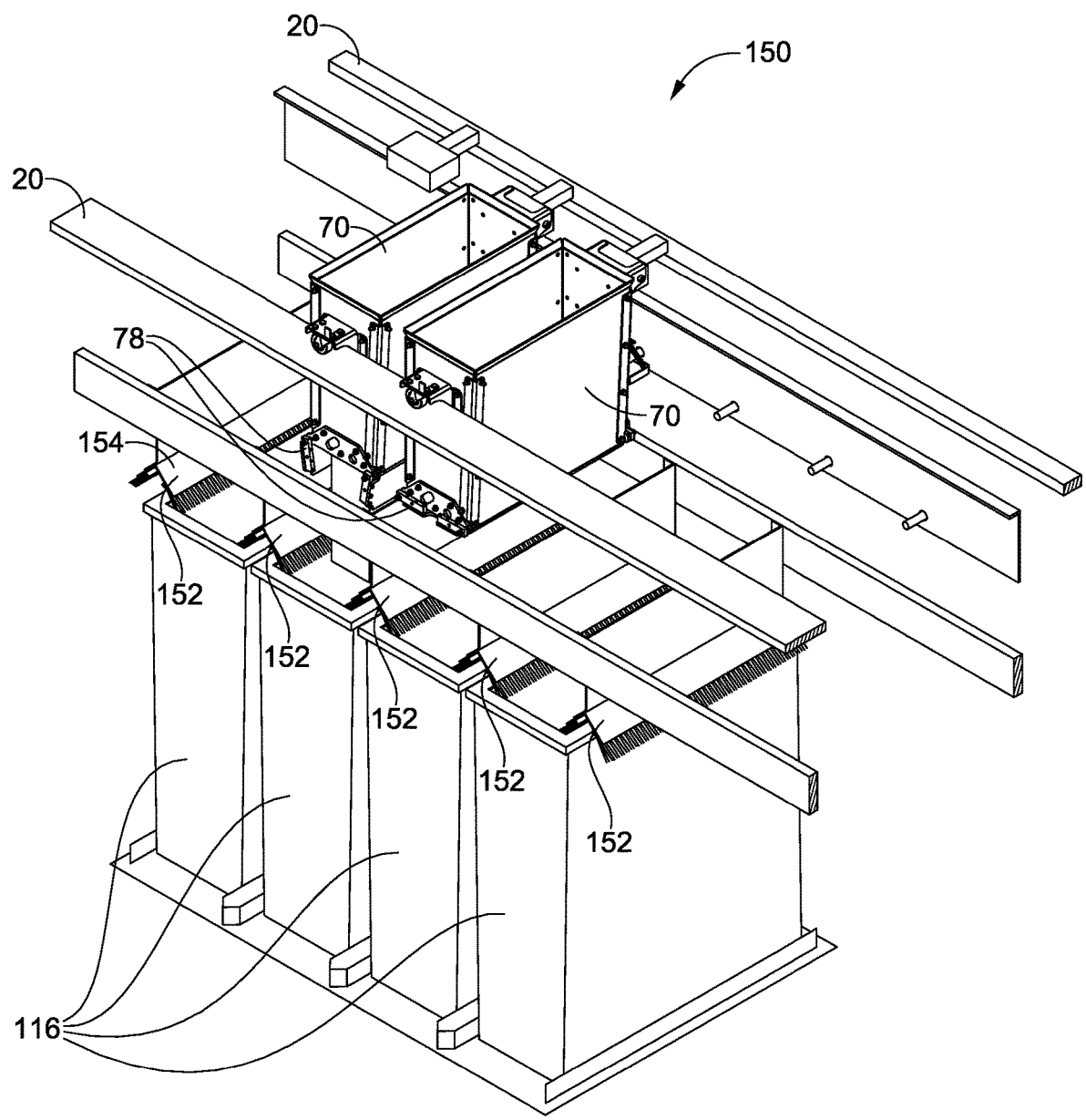
FIG. 20 depicts a system for transferring objects that includes additional object-guiding features, in accordance with an embodiment of the present disclosure.

Looking now at FIG. 20, another system 150 for transferring objects is shown, in accordance with an embodiment of the present disclosure. The system 150 is similar to the system 110. For example, the system 150 includes the track 20, the bins 70, and the containers 116. The system 150 like the system 110 can be used to shift objects, e.g., for routing to a downstream location. However, the system 150 additionally includes object-guides 152. The example object-guides 152 shown in FIG. 20 each include a substantially rigid portion 154 and a substantially non-rigid portion 155. The rigid portion 154 can be formed of metal, metal alloy, and/or polymers of sufficient rigidity to substantially maintain a constant geometry. The non-rigid portion 155 can be formed of similar or different materials that have a higher degree of elasticity or flexibility (e.g., as determined using ASTM-E8/E8M or ASTM D790 or ASTM D6272) than the rigid portion 154. In one instance, the rigid portion 154 may be formed of sheet metal or sheet metal alloy, and the non-rigid portion 155 may be formed of more flexible metal, composite, or polymer bristles, among other possibilities. The object-guides 152 have been demonstrated through testing to increase the consistency of object deposit within the containers 116, among other benefits.

Figure 21:
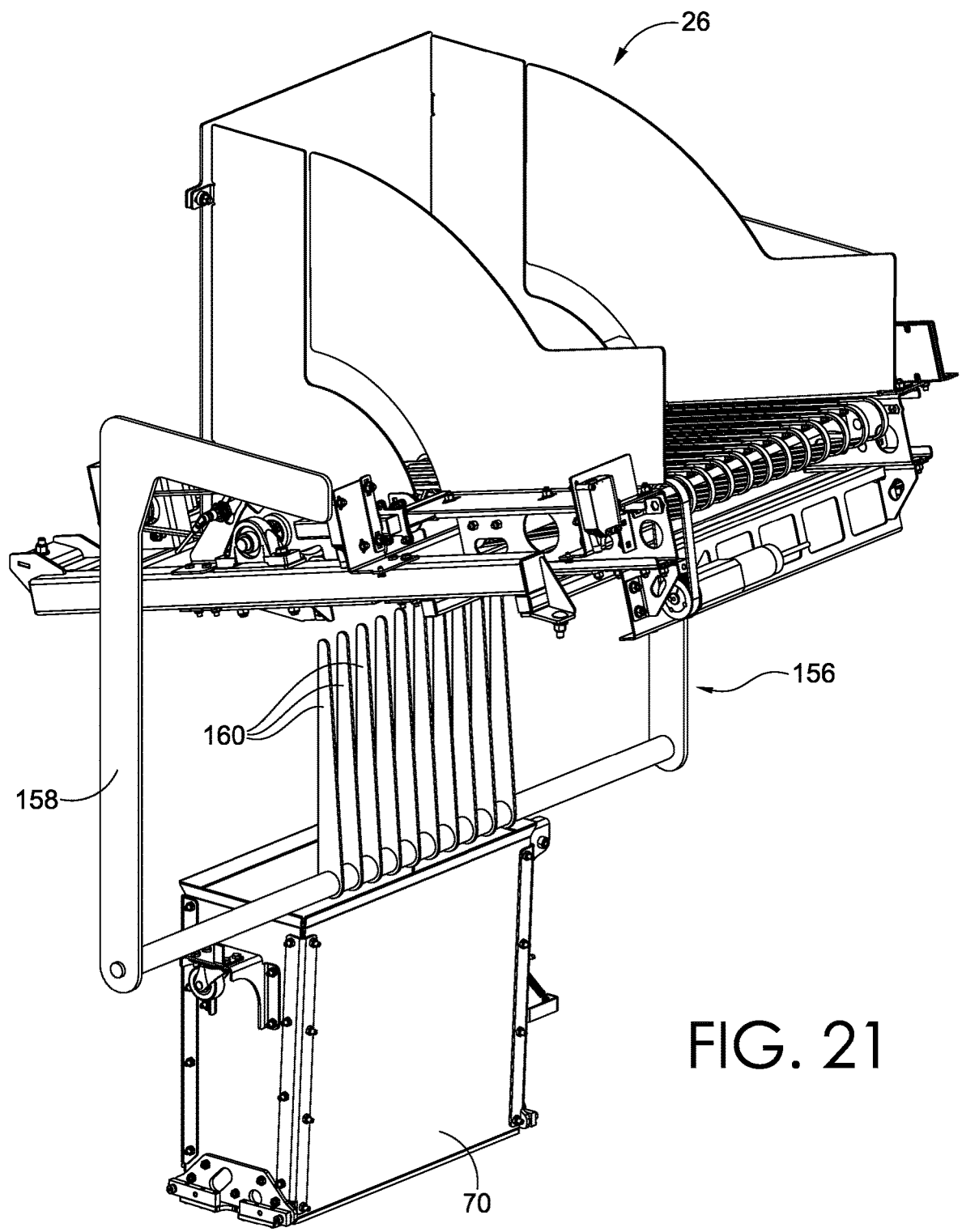
FIG. 21 depicts the object-orienting mechanism generally of FIG. 3 with additional object-guiding features included, in accordance with an embodiment of the present disclosure.

FIG. 21 depicts the object-orienting mechanism 26 generally of FIG. 3 with additional object-guiding features included, in accordance with an embodiment of the present disclosure. In FIG. 21, the object-orienting mechanism 26 is positioned over one of the bins 70. Installed generally between the object-orienting mechanism 26 and the bin 70 is another object-guide 156. The object-guide 156 includes a frame 158 and a plurality of extensions 160 that extend from the frame 158 towards the object-orienting mechanism 26 generally so that the plurality of extensions 160 are aligned with a trajectory of an object that passes from the object-orienting mechanism 26 to the bin 70. This configuration has been demonstrated to increase the consistency of object deposit into the bin 70, among other benefits. The object-guide 156 can be formed of substantially rigid materials as described in connection with FIG. 21.

Figure 22A:
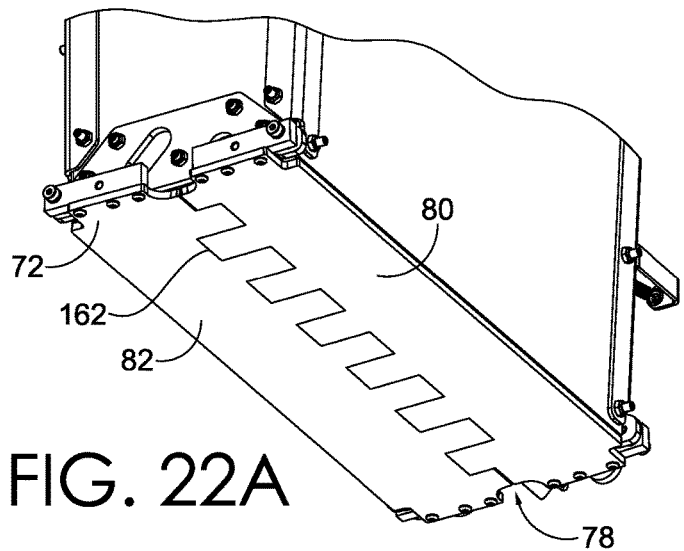
FIGS. 22A-22C depict additional configurations of a bin used for transporting objects, in accordance with an embodiment of the present disclosure.
Figure 22B:
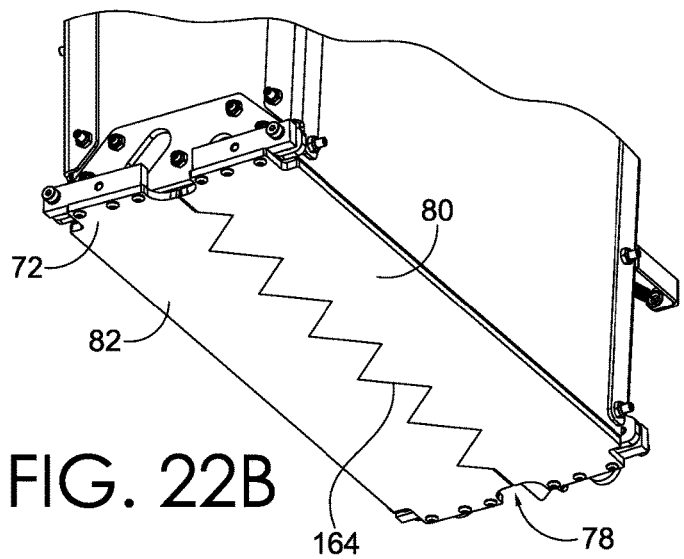
Figure 22C:
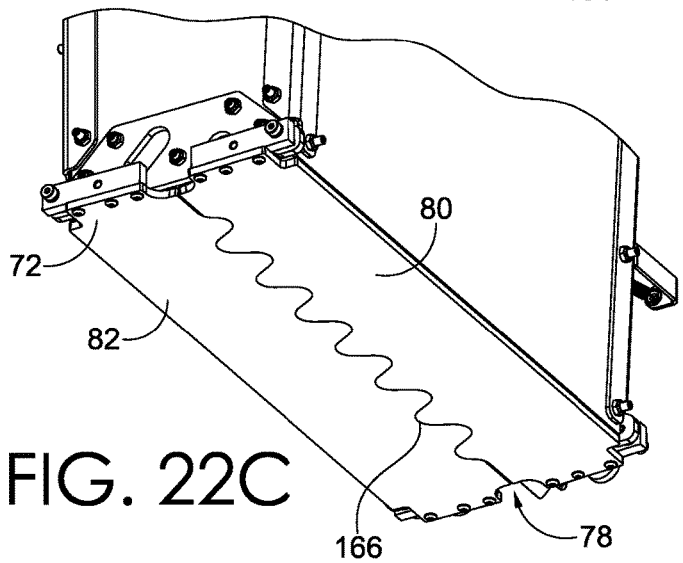

FIGS. 22A-22C depict additional configurations of a bin used for transporting objects, e.g., as described in connection with FIGS. 12-15, in accordance with an embodiment of the present disclosure. FIGS. 22A-22C again depict the pair of doors 80, 82 attached to the releasing mechanism 78 as described in connection with FIGS. 12-15. However, the edges of the doors 80, 82 that substantially adjoin and abut each other in the closed configuration (generally shown in FIGS. 22A-22C) have different geometries. For example, in FIG. 22A, edges 162 of the doors 80, 82 form a non-linear and substantially interlocking pattern, and in FIG. 22B, edges 164 of the doors 80, 82 form a non-linear and substantially zig-zag, interlocking pattern, and in FIG. 22C, edges 166 of the doors 80, 82 form a non-linear and substantially wave-like, interlocking pattern. These non-linear adjoining configurations have been demonstrated through testing to reduce, inhibit, or substantially eliminate instances of thinner objects (e.g., packages or envelopes of less than 1 centimeter in thickness) from otherwise falling through a gap between the doors 80, 82.

Figure 23:
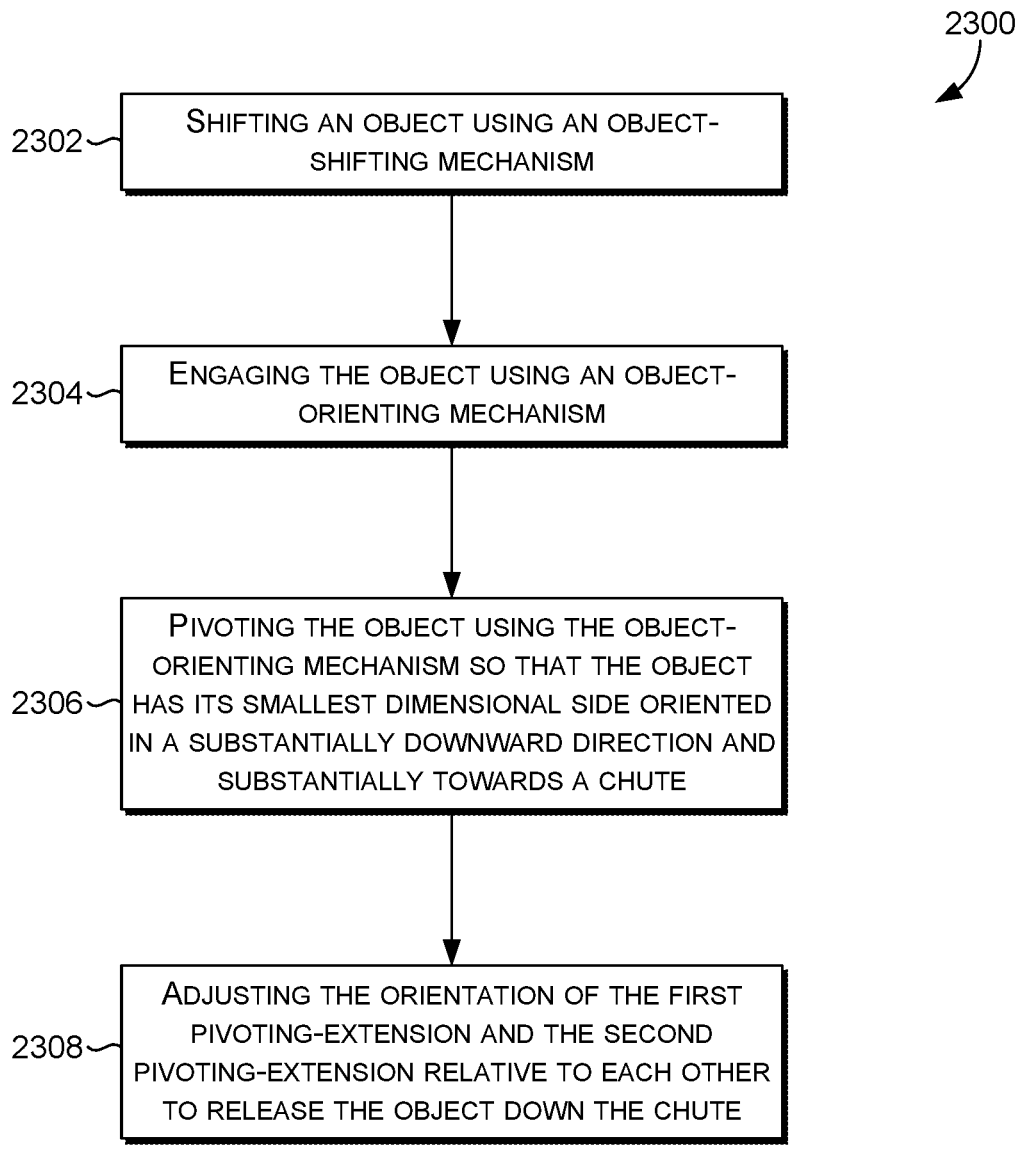
FIG. 23 is a block diagram of a method for shifting objects, in accordance with an embodiment of the present disclosure.

Referring now to FIG. 23, a block diagram of an example method 2300 of re-orienting objects during a shifting process is shown, in accordance with an embodiment of the present disclosure. The method includes blocks 2302-2308, but is not limited to this selection of elements. In block 2302, the method 2300 includes shifting an object, e.g., a parcel or package being routed to a destination, e.g., in a logistics network, using an object-shifting mechanism, e.g., the object-supply mechanism 14 shown in FIG. 2. In block 2304, the method 2300 includes engaging the object with an object-orienting mechanism, e.g., the object-orienting mechanism 26 shown in FIG. 3. In one aspect, the object-orienting mechanism may include a first-pivoting extension, e.g., the pivoting-extension 46 shown in FIG. 3, and a second pivoting-extension, e.g. the pivoting-extension 48 shown in FIG. 3, wherein the first pivoting-extension and the second pivoting-extension can rotate independently about a common pivot-assembly, e.g., the pivot-assembly 30 shown in FIG. 3. In block 2306, the method 2300 includes pivoting the object using the object-orientating mechanism so that the object has its smallest dimensional side oriented in a substantially downward direction, e.g., at least partially towards a ground surface, e.g., at least partially aligning with a direction of gravity, and substantially towards a chute, e.g., the chute 64 shown in FIG. 3. In block 2308, the method 2300 includes adjusting the orientation of the first pivoting-extension and the second pivoting-extension relative to each other to release the object down the chute, e.g., pivoting at least one of the first-pivoting extension and the second pivoting extension to align at least partially with the chute, allowing the object to drop using gravity, e.g., into a bin for further shifting, organizing, and/or routing, as described herein.

Clause 1. A system for shifting objects comprising an object-supply mechanism; an object-orienting mechanism positioned such that the object-supply mechanism can transfer objects onto the object-orienting mechanism; a track extending under the object-orienting mechanism; a plurality of bins shiftable along the track; and a shifting mechanism operable to shift the plurality of bins along the track such that each bin passes under the object-orienting mechanism, wherein each bin comprises a base, at least one sidewall extending from the base to an opening that is alignable with the object-orienting mechanism, and a releasing mechanism at the base that is adjustable between a closed configuration and an open configuration.

Clause 2. The system of clause 1, wherein the object-supply mechanism comprises at least one conveyor.

Clause 3. The system of clause 1 or 2, wherein the object-orienting mechanism comprises a plurality of pivoting-extensions coupled to a pivot-assembly, and wherein the plurality of pivoting-extensions are shiftable to different positions relative to each other.

Clause 4. The system of any of clauses 1-3, wherein the track comprises at least one belt; and a plurality of support structures coupled to the at least one belt in spaced-apart relation, wherein each support structure is configured to support one of the plurality of bins in an upright orientation such that its opening is alignable with the object-orienting mechanism.

Clause 5. The system of any of clauses 1-4, wherein each support structure engages a corresponding bin on at least one side thereof, and wherein each bin includes a wheel that is supportable on the track.

Clause 6. The system of any of clauses 1-5, wherein the shifting mechanism comprises at least one rotational actuator that is operable to translate the at least one belt along the track, wherein the track is a substantially continuous track, and wherein the track transitions to different vertical heights.

Clause 7. The system of any of clauses 1-6, wherein the releasing mechanism comprises a pair of doors, a cam plate pivotally coupled to the bin; a linkage pivotally connected to the cam plate and pivotally connected to the pair of doors, the linkage adjustable between a first configuration, in which the pair of doors are substantially closed, and a second configuration, in which the pair of doors are substantially open.

Clause 8. The system of any of clauses 1-7, further comprising at least one linear actuator, wherein each linear actuator is adjustable between a retracted position and an extended position, wherein, in the extended position, the linear actuator operates the releasing mechanism on each bin that is shifted into contact with the linear actuator using the shifting mechanism.

Clause 9. The system of any of clauses 1-8, further comprising a separate track that extends under at least part of the track; and a plurality of containers supportable on the separate track, wherein each container comprises a base, and at least one sidewall extending from the base to an opening that is alignable with the base of a bin positioned on the track, such that when the releasing mechanism of the bin positioned on the track is opened, objects in the bin are released into the container.

Clause 10. The system of any of clauses 1-9, further comprising a container-flipping mechanism; and a chute comprising an opening, wherein the container-flipping mechanism is adapted to engage a container on the separate track and flip it so that the opening of the container is at least partially aligned with the opening of the chute.

Clause 11. An object-orienting mechanism, comprising a pivot-assembly; a first pivoting-extension coupled to the pivot-assembly and to a first rotational actuator; and a second pivoting-extension coupled to the pivot-assembly and to a second rotational actuator, wherein the first pivoting-extension and the second pivoting-extension are independently rotatable about the pivot-assembly.

Clause 12. The object-orienting mechanism of clause 11, wherein the first pivoting-extension and the second pivoting-extension are rotatable in opposite rotational directions and in common rotational directions.

Clause 13. The object-orienting mechanism of clause 11 or 12, wherein the first pivoting-extension and the second pivoting-extension are rotatable into substantially linear alignment along a common-facing direction, and wherein the first pivoting-extension and the second pivoting-extension are rotatable into substantially linear alignment along opposite-facing directions.

Clause 14. The object-orienting mechanism of any of clauses 11-13, wherein the first pivoting-extension is at least twice a length of the second pivoting-extension.

Clause 15. The object-orienting mechanism of any of clauses 11-14, wherein the first pivoting-extension comprises a first plurality of spaced-apart fingers, and wherein the second pivoting-extension comprises a second plurality of spaced-apart fingers, and wherein the first plurality of spaced-apart fingers and the second plurality of spaced-apart fingers are rotatable into a common plane to form an alternating sequence.

Clause 16. The object-orienting mechanism of any of clauses 11-15, further comprising a plurality of transfer mechanisms positioned adjacent to the first pivoting-extension, the plurality of transfer mechanisms spaced-apart and arranged in a substantially parallel configuration, wherein the first pivoting-extension is rotatable into substantially linear alignment with the plurality of transfer mechanisms, such that the first plurality of fingers and the plurality of transfer mechanisms are arranged in an alternating sequence.

Clause 17. The object-orienting mechanism of any of clauses 11-16, wherein each transfer mechanism comprises a belt positioned over a plurality of rollers.

Clause 18. The object-orienting mechanism of any of clauses 11-17, further comprising a chute positioned adjacent to the pivot-assembly, wherein the first pivoting-extension is configured to lift an object positioned on the plurality of transfer mechanisms, and rotate the object toward the chute while supporting the object with the second pivoting-extension that is oriented approximately perpendicular to the first pivoting-extension, and then release the object into the chute by shifting the first pivoting-extension and the second pivoting-extension into an opposite-extension orientation.

Clause 19. A bin for transporting objects, comprising a base; at least one sidewall extending from the base to an opening; and a releasing mechanism attached to the base, the releasing mechanism comprising a pair of doors, a cam plate pivotally coupled to the at least one sidewall, and a linkage pivotally connected to the cam plate and pivotally connected to the pair of doors, the linkage adjustable between a first configuration, in which the pair of doors are substantially closed, and a second configuration, in which the pair of doors are substantially open.

Clause 20. The bin of clause 19, wherein the bin further comprises a first support-structure extending from a first side of the bin; and a second support-structure extending from a second side of the bin.

Clause 21. The bin of clause 19 or 20, wherein the linkage comprises a first arm comprising a first end and a second end, the first end of the first arm pivotally coupled to the cam plate, and the second end of the first arm pivotally coupled to a first one of the pair of doors, and a second arm comprising a first end and a second end, the first end of the second arm pivotally coupled to the cam plate, and the second end of the second arm pivotally coupled to a second one of the pair of doors.

Clause 22. The bin of any of clauses 19-21, wherein the pair of doors are pivotally coupled adjacent to the base, and/or slidably coupled adjacent to the base.

Clause 23. A method of re-orienting objects during routing, the method comprising shifting an object using an object-shifting mechanism; engaging the object using an object-orienting mechanism comprising a first pivoting-extension, and a second pivoting-extension, wherein the first pivoting-extension and the second pivoting-extension rotate independently about a pivot-assembly; pivoting the object using the object-orienting mechanism so that the object has its smallest dimensional side oriented in a substantially downward direction and substantially towards a chute; and adjusting an orientation of the first pivoting-extension and the second pivoting-extension relative to each other to release the object down the chute.

Clause 24. The preceding clauses 1-23 in any combination.

In some embodiments, this disclosure may include the language, for example, "at least one of [element A] and [element B]." This language may refer to one or more of the elements. For example, "at least one of A and B" may refer to "A," "B," or "A and B." In other words, "at least one of A and B" may refer to "at least one of A and at least one of B," or "at least either of A or B." In some embodiments, this disclosure may include the language, for example, "[element A], [element B], and/or [element C]." This language may refer to either of the elements or any combination thereof. In other words, "A, B, and/or C" may refer to "A," "B," "C," "A and B," "A and C," "B and C," or "A, B, and C."

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations of elements, as well as use of elements not shown, are also possible and contemplated.

What is claimed is:

1. A system for shifting objects, comprising:
an object-supply mechanism;
an object-orienting mechanism positioned such that the object-supply mechanism can transfer the objects onto the object-orienting mechanism;

a track extending under the object-orienting mechanism;
a plurality of bins shiftable along the track; and
a shifting mechanism operable to shift the plurality of bins along the track such that each bin of the plurality of bins passes under the object-orienting mechanism,
wherein each bin of the plurality of bins comprises:
a base,
at least one sidewall extending from the base to an opening that is alignable with the object-orienting mechanism, and
a releasing mechanism at the base that is adjustable between a closed configuration and an open configuration.

2. The system of claim 1, wherein the object-supply mechanism comprises at least one conveyor.

3. The system of claim 2, wherein the object-orienting mechanism comprises a plurality of pivoting-extensions coupled to a pivot-assembly, and wherein the plurality of pivoting-extensions are shiftable to different positions relative to each other.

4. The system of claim 1, wherein the track comprises:
at least one belt; and
a plurality of support structures coupled to the at least one belt in spaced-apart relation,
wherein each support structure of the plurality of support structures is configured to support a corresponding bin of the plurality of bins in an upright orientation such that the opening of the corresponding bin is alignable with the object-orienting mechanism.

5. The system of claim 4, wherein each support structure of the plurality of support structures engages the corresponding bin on at least one side thereof, and the corresponding bin includes a wheel that is supportable on the track.

6. The system of claim 4, wherein the shifting mechanism comprises at least one rotational actuator that is operable to translate the at least one belt along the track, and the track is substantially continuous and transitions to different vertical heights.

7. The system of claim 1, wherein the releasing mechanism comprises:
a pair of doors,
a cam plate pivotally coupled to the bin, and
a linkage pivotally connected to the cam plate and pivotally connected to the pair of doors, the linkage adjustable between a first configuration, in which the pair of doors is substantially closed, and a second configuration, in which the pair of doors is substantially open.

8. The system of claim 1, further comprising at least one linear actuator, wherein the at least one linear actuator is adjustable between a retracted position and an extended position, and, in the extended position, the at least one linear actuator operates the releasing mechanism on each bin of the plurality of bins such that the bin is shifted into contact with the at least one linear actuator using the shifting mechanism.

9. The system of claim 1, further comprising:
a separate track that extends under at least part of the track; and
a plurality of containers supportable on the separate track, wherein each container of the plurality of containers comprises:
a base, and
at least one sidewall extending from the base to an opening that is alignable with the base of a bin of the plurality of bins positioned on the track, such that when the releasing mechanism of the bin positioned on the track is opened, an object in the bin is released into the container.

10. The system of claim 9, further comprising:
a container-flipping mechanism; and
a chute comprising an opening,
wherein the container-flipping mechanism is adapted to engage a container of the plurality of containers on the separate track and flip the container so that the opening of the container is at least partially aligned with the opening of the chute.

11. A bin for transporting objects, comprising:
a base;
at least one sidewall extending from the base to an opening; and
a releasing mechanism attached to the base, the releasing mechanism comprising:
a pair of doors,
a cam plate pivotally coupled to the at least one sidewall, and
a linkage pivotally connected to the cam plate and pivotally connected to the pair of doors, the linkage adjustable between a first configuration, in which the pair of doors is substantially closed, and a second configuration, in which the pair of doors is substantially open.

12. The bin of claim 11, wherein the bin further comprises:
a first support-structure extending from a first side of the bin; and
a second support-structure extending from a second side of the bin.

13. The bin of claim 11, wherein the linkage comprises:
a first arm comprising a first end and a second end, the first end of the first arm pivotally coupled to the cam plate, and the second end of the first arm pivotally coupled to a first one of the pair of doors, and
a second arm comprising a first end and a second end, the first end of the second arm pivotally coupled to the cam plate, and the second end of the second arm pivotally coupled to a second one of the pair of doors.

14. The bin of claim 11, wherein the pair of doors is at least one of:
pivotally coupled adjacent to the base, or
slidably coupled adjacent to the base.

15. A bin of claim 11, wherein the cam plate is pivotally coupled to the at least one sidewall via a pivot-connection, and the pivot-connection comprises a spring extending from a first spring-connection located on the cam plate and a second spring-connection located on the at least one sidewall such that when the releasing mechanism is operated, the cam plate is rotated, causing the linkage to adjust to the first configuration and extending the spring to bias the cam plate, and when the releasing mechanism is no longer operated, the cam plate rotates back to an original position, causing the linkage to adjust to the second configuration.

16. A method comprising:
transferring an object from an object-supply mechanism onto an object-orienting mechanism;
pivoting, via the object-orienting mechanism, the object into a desired orientation;
shifting, via a shifting mechanism, a bin of a plurality of bins along a first track extending under the object-orienting mechanism to position the bin under the object-orienting mechanism so that at least one sidewall extending from a base of the bin to an opening of the bin is aligned with the object-orienting mechanism;

depositing, via the object-orienting mechanism, the object into the bin; and upon depositing the object into the bin:
- shifting, via the shifting mechanism, the bin along the first track to position the bin over a container of a plurality of containers supported by a second track that extends under at least part of the first track so that at least one sidewall extending from a base of the container to an opening of the container is aligned with the base of the bin;
- releasing, via a releasing mechanism, the base of the bin to deposit the object into the container; and
- engaging, via a container-flipping mechanism, the container to flip the container so that the opening of the container is at least partially aligned with an opening of a chute to deposit the object onto the chute.

17. The method of claim 16, wherein shifting the bin along the first track to position the bin under the object-orienting mechanism comprises shifting a support structure of the first track that is configured to engage at least one side of the bin and support the bin in an upright orientation so that the opening of the bin can be aligned with the object-orienting mechanism.

18. The method of claim 16, wherein pivoting the object into the desired orientation comprising pivoting the object via the object-orienting mechanism shifting a plurality of pivoting-extensions coupled to a pivot-assembly to different positions relative to each other.

19. The method of claim 16, wherein releasing the base of the bin to deposit the object into the container comprises operating, via the releasing mechanism, a linkage pivotally connected to a pair of doors to adjust to the pair of doors to a position that is substantially open.

20. The method of claim 16, wherein releasing the base of the bin to deposit the object into the container comprises operating the releasing mechanism via at least one linear actuator to an extended position to shift the bin into contact with the at least one linear actuator.

* * * * *